United States Patent
Beckman et al.

(10) Patent No.: US 9,745,050 B2
(45) Date of Patent: Aug. 29, 2017

(54) SELECTING PROPELLERS FOR PERFORMANCE AND NOISE SHAPING

(71) Applicant: Amazon Technologies, Inc., Seattle, WA (US)

(72) Inventors: Brian C. Beckman, Newcastle, WA (US); Allan Ko, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 47 days.

(21) Appl. No.: 14/975,563

(22) Filed: Dec. 18, 2015

(65) Prior Publication Data

US 2017/0174317 A1 Jun. 22, 2017

(51) Int. Cl.
*G05D 1/00* (2006.01)
*G05D 1/06* (2006.01)
(Continued)

(52) U.S. Cl.
CPC .............. *B64C 11/00* (2013.01); *B64C 27/08* (2013.01); *B64C 27/32* (2013.01); *B64C 39/024* (2013.01);
(Continued)

(58) Field of Classification Search
CPC ....... B64C 11/00; B64C 39/024; B64C 27/08; B64C 27/32; B64C 2201/108;
(Continued)

(56) References Cited

U.S. PATENT DOCUMENTS 1,585,218 A * 5/1926 Watanabe ............... B64C 11/48
  181/206
4,947,356 A * 8/1990 Elliott ...................... B64C 1/40
  244/1 N (Continued)

FOREIGN PATENT DOCUMENTS

| CN | 104290904 A | 1/2015 |
| CN | 105691613 A | 6/2016 |
| WO | 2008054234 A1 | 5/2008 |

OTHER PUBLICATIONS

International Search Report and Written Opinion for PCT Application No. PCT/US2016/065662 dated Mar. 10, 2017.
(Continued)

*Primary Examiner* — Jaime Figueroa
(74) *Attorney, Agent, or Firm* — Athorus, PLLC

(57) ABSTRACT

Aerial vehicles may be operated with discrete sets of propellers, which may be selected for a specific purpose or on a specific basis. The discrete sets of propellers may be operated separately or in tandem with one another, and at varying power levels. For example, a set of propellers may be selected to optimize the thrust, lift, maneuverability or efficiency of an aerial vehicle based on a position or other operational characteristic of the aerial vehicle, or an environmental condition encountered by the aerial vehicle. At least one of the propellers may be statically or dynamically imbalanced, such that the propeller emits a predetermined sound during operation. A balanced propeller may be specifically modified to cause the aerial vehicle to emit the (Continued)

predetermined sound by changing one or more parameters of the balanced propeller and causing the balanced propeller to be statically or dynamically imbalanced.

18 Claims, 12 Drawing Sheets

(51) Int. Cl.
　　　G05D 3/00　　　　　(2006.01)
　　　G06F 7/00　　　　　(2006.01)
　　　G06F 17/00　　　　 (2006.01)
　　　B64C 11/00　　　　 (2006.01)
　　　B64C 39/02　　　　 (2006.01)
　　　G01C 21/00　　　　 (2006.01)
　　　G05D 13/00　　　　 (2006.01)
　　　B64C 27/32　　　　 (2006.01)
　　　B64C 27/08　　　　 (2006.01)
　　　G05D 1/10　　　　　(2006.01)

(52) U.S. Cl.
　　　CPC ............. *G01C 21/00* (2013.01); *G05D 1/101* (2013.01); *G05D 13/00* (2013.01); *B64C 2201/024* (2013.01); *B64C 2201/108* (2013.01); *B64C 2201/128* (2013.01); *B64C 2201/141* (2013.01)

(58) Field of Classification Search
　　　CPC ........ B64C 2201/024; B64C 2201/141; B64C 2201/128; G01C 21/00; G05D 13/00; G05D 1/101
　　　USPC ........................................................ 701/1, 5
　　　See application file for complete search history.

(56) References Cited

U.S. PATENT DOCUMENTS

| | | | |
|---|---|---|---|
| 8,128,033 B2* | 3/2012 | Raposo ................. | A63H 23/00 244/171.2 |
| 2005/0271221 A1* | 12/2005 | Cerwin ................. | H04R 1/406 381/92 |
| 2007/0200027 A1* | 8/2007 | Johnson ............... | B64C 39/022 244/3.1 |
| 2010/0301168 A1* | 12/2010 | Raposo ................. | A63H 23/00 244/171.2 |
| 2013/0056581 A1* | 3/2013 | Sparks ................. | G10K 11/175 244/1 N |
| 2013/0163774 A1* | 6/2013 | Maeda ................. | G10K 11/178 381/71.4 |
| 2014/0270220 A1* | 9/2014 | Bieler ................. | G10K 11/1788 381/71.4 |
| 2015/0056058 A1* | 2/2015 | Grissom ............... | F04D 29/665 415/1 |
| 2015/0125268 A1* | 5/2015 | Koopmann ........... | B64C 11/001 415/119 |
| 2015/0274286 A1 | 10/2015 | Kereth | |
| 2016/0068264 A1* | 3/2016 | Ganesh ................ | G08G 5/0069 701/2 |
| 2016/0105139 A1* | 4/2016 | Tillotson .............. | H04B 5/0025 318/16 |
| 2016/0159471 A1* | 6/2016 | Chan ..................... | B64C 39/024 244/39 |
| 2016/0214728 A1* | 7/2016 | Rossi ...................... | B64C 27/08 |
| 2016/0229534 A1* | 8/2016 | Hutson .................. | B64C 27/08 |
| 2016/0264234 A1* | 9/2016 | Vaughn ................. | A63H 27/12 |
| 2016/0311528 A1* | 10/2016 | Nemovi ................. | B64C 27/82 |
| 2016/0337771 A1* | 11/2016 | Di Censo ............... | H04R 29/00 |

OTHER PUBLICATIONS

MavLab TUDelft: "delftAcopter", YouTube, Sep. 19, 2016, pp. 1-1, XP054977145, https://youtube.com/watch?v=wj0gV08Hdr8, [retrieved on Feb. 8, 2017], video part between 6-10 secs.

* cited by examiner

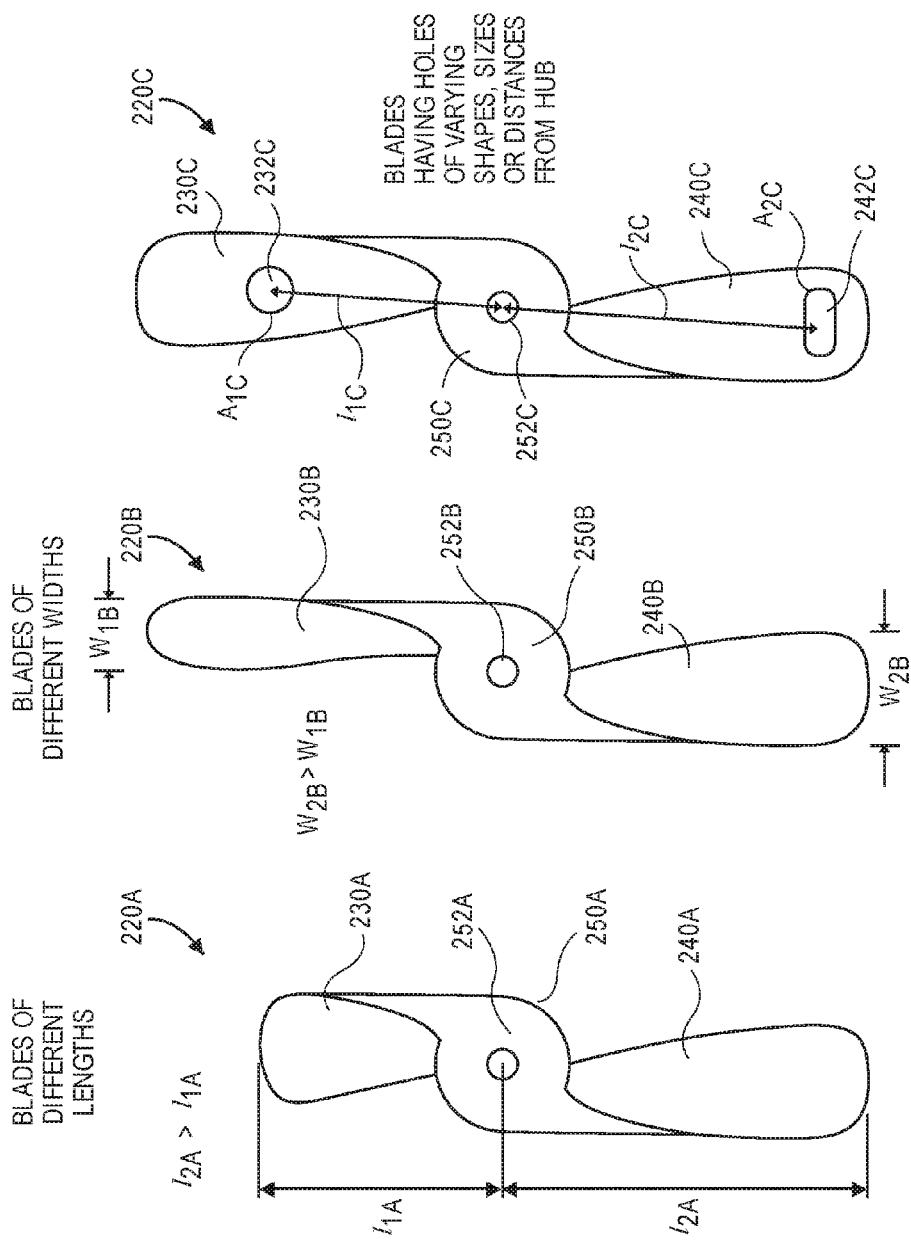

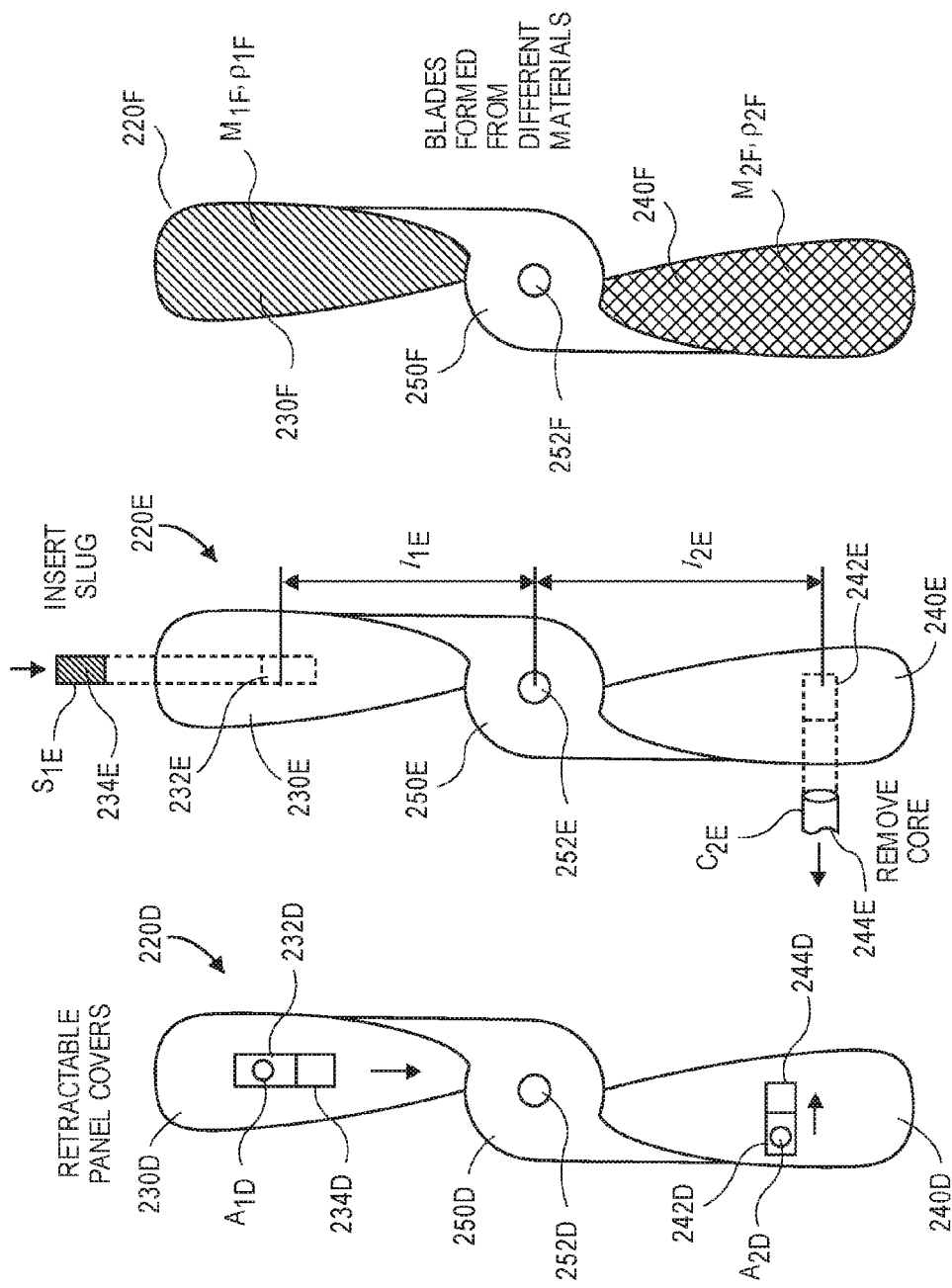

SELECTING PROPELLERS FOR PERFORMANCE AND NOISE SHAPING

BACKGROUND

Sound is kinetic energy released by vibrations of molecules in a medium, such as air. In industrial applications, sound may be generated in any number of ways or in response to any number of events. For example, sound may be generated in response to vibrations resulting from impacts or frictional contact between two or more bodies. Sound may also be generated in response to vibrations resulting from the rotation of one or more bodies such as shafts, e.g., by motors or other prime movers. Sound may be further generated in response to vibrations caused by fluid flow over one or more bodies. In essence, any movement of molecules, or contact between molecules, that causes a vibration may result in the emission of sound at a pressure level or intensity, and at one or more frequencies.

The use of unmanned aerial vehicles such as airplanes or helicopters having one or more propellers is increasingly common. Such vehicles may include fixed-wing aircraft, or rotary wing aircraft such as quad-copters (e.g., a helicopter having four rotatable propellers), octo-copters (e.g., a helicopter having eight rotatable propellers) or other vertical take-off and landing (or VTOL) aircraft having one or more propellers. Typically, each of the propellers is powered by one or more rotating motors or other prime movers.

A propeller is statically balanced (or in static balance) when the propeller remains at rest, and may remain in any position, when the propeller is not powered. A propeller is dynamically balanced (or in dynamic balance) when the propeller rotates evenly and without vibration. For example, a propeller that is statically balanced may be dynamically imbalanced, when the blades of the propeller have different centers of mass or gravity, or centers of mass or gravity that are not in common planes, such that centrifugal forces act on the blades in different planes and do not counteract one another. Conversely, where a propeller is dynamically balanced, centrifugal forces acting on the blades are equal to and counteract one another, and any vibrations observed should be minimal.

Traditionally, the balancing of propellers has been recognized one of the most important considerations of a properly operating aerial vehicle. For example, in aircraft having large propellers, vibrations generated by propellers that are either statically or dynamically imbalanced have resulted in undue stresses to crankshafts or other component parts. In aerial vehicles of all sizes, such vibrations may result in undesired or untenable noise levels within a vicinity of the rotating aircraft.

An aerial vehicle is typically outfitted with a homogenous set of propellers that are balanced, both statically and dynamically, during operation. The propellers may be operated collectively or in groups. For example, a quad-copter having four propellers may operate each of the four propellers during take-off or landing evolutions, where the quad-copter's lift capacity is preferably maximized. When the quad-copter is aloft at a desired altitude, and a maximum lift capacity is no longer desired, motors associated with one or more of the propellers may be stopped for any reason, such as to preserve power or fuel.

BRIEF DESCRIPTION OF THE DRAWINGS

FIGS. 2A through 2I are views of imbalanced propellers in accordance with embodiments of the present disclosure.

DETAILED DESCRIPTION

Figure 1A:
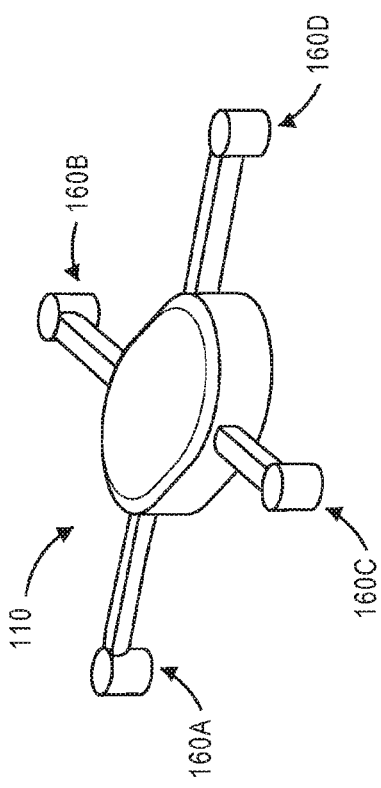
FIGS. 1A through 1C are views of aspects of an aerial vehicle in accordance with embodiments of the present disclosure.

As is set forth in greater detail below, the present disclosure is directed to operating aerial vehicles with discrete sets of propellers, including one or more imbalanced propellers. More specifically, the present disclosure is directed to selecting a complement of propellers on any basis and outfitting an aerial vehicle with the selected complement of propellers. For example, one or more of the propellers of the complement may be selected on any basis, including but not limited to any operational characteristics or environmental conditions associated with a mission of the aerial vehicle, or any sounds that may be preferably emitted during operation. In some embodiments, an aerial vehicle may be outfitted with a set of propellers that are knowingly and intentionally out of balance, either statically or dynamically. The aerial vehicle may then be operated with the complement of propellers operating in any manner, e.g., alone or in any combination, in order to complete a mission, in accordance with a transit plan, or in order to cause the aerial vehicle to emit any kind or type of sound.

In some embodiments, an aerial vehicle may be outfitted with a discrete set of one or more propellers of a first type, or propellers having a first operational attribute, and with a discrete set of one or more propellers of a second type, or propellers having a second operational attribute. During operation, power may be selectively applied to each of motors for rotating the propellers of the first set, or each of motors for rotating the propellers of the second set, as necessary, in order to exploit one or more characteristics or attributes of propellers of the respective types or having the respective operational attributes. For example, a first set of propellers may be configured to maximize one or more of thrust, lift, maneuverability or efficiency, e.g., to conserve power and/or fuel, while a second set of propellers may be configured based on one or more acoustic considerations, e.g., to emit sound at a predetermined sound pressure level (or intensity) and/or at a frequency, or within a frequency spectrum (or distribution, pattern or band). The propellers of the first set and the propellers of the second set may have different radii or diameters, masses, blade lengths, blade widths, blade shapes or blade angles. The propellers may further have different numbers of blades, as necessary. Moreover, the first set of propellers and the second set of propellers may be selected on any operational consideration and/or environmental condition anticipated during a predetermined mission, including but not limited to a location of an origin or a destination for a mission, a dimension or mass of a payload, a course or a speed to be followed during the mission, or any anticipated temperatures, pressures, humidities, wind speeds or directions, weather events, measures or levels of cloud coverage or sunshine, or surface conditions or textures of an environment between and including the origin and the destination.

In some embodiments, an aerial vehicle may be outfitted with a first set of one or more balanced propellers, as well as a second set of one or more specific imbalanced propellers, or propellers that have varied or modified parameters which cause the propellers to radiate sounds at specific sound pressure levels or intensities and within specific frequency spectrums during operation. During operation, power may be selectively applied to each of motors for rotating the propellers of the first set, or each of motors for rotating the propellers of the second set, as necessary, in order to shape the sounds that are radiated from the aerial vehicle. A set of one or more imbalanced propellers may be selected based at least in part on one or more acoustic considerations, e.g., to emit sound at a predetermined sound pressure level (or intensity) and/or within a predetermined frequency spectrum. For example, where controlling or limiting the sounds emitted by an aerial vehicle is not a primary concern, the complement of propellers may be operated, as necessary, in order to achieve any operational objectives (e.g., course, speed, payload, or the like). Where a specific sound is desired to be emitted by the aerial vehicle, e.g., where the aerial vehicle operates within earshot of any humans or other animals, the propellers of the complement may be operated, as necessary, in order to shape the overall sound profile of the aerial vehicle, and to cause the specific sound to be emitted thereby.

Figure 1B:
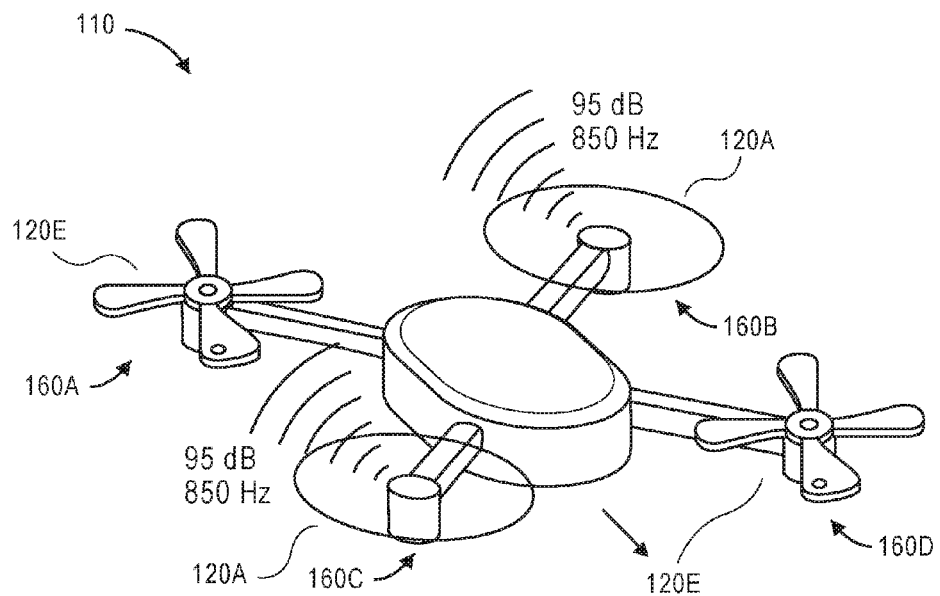
Figure 1C:
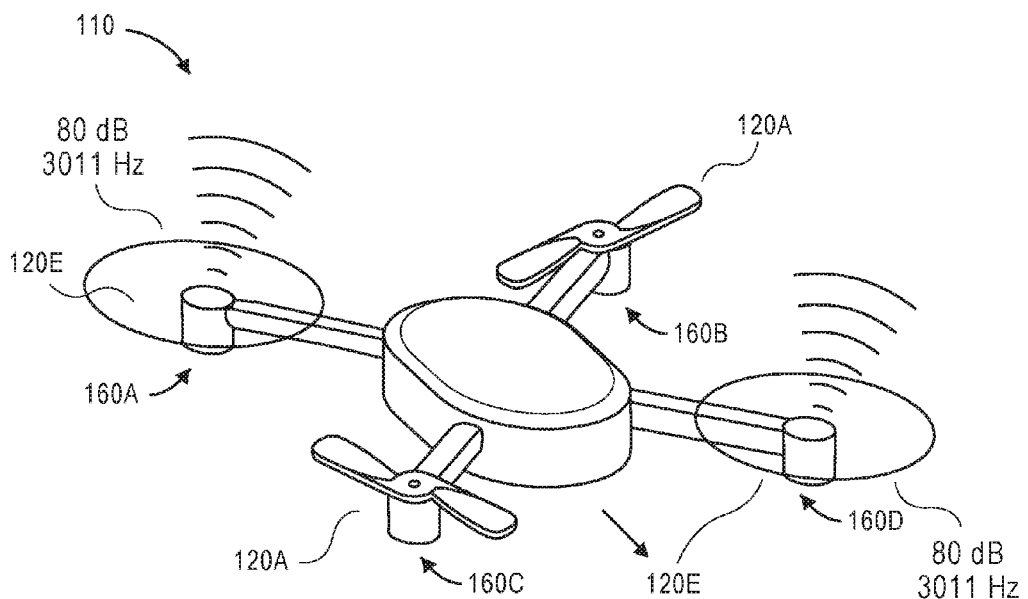

Referring to FIGS. 1A through 1C, an aerial vehicle 110 and a plurality of propellers 120A, 120B, 120C, 120D, 120E is shown. The aerial vehicle 110 includes four motors 160A, 160B, 160C, 160D, each configured to receive one of the propellers 120A, 120B, 120C, 120D, 120E. For example, each of the motors 160A, 160B, 160C, 160D may have a shaft configured with one or more bolted, quick-release, or other connections for interchangeably mounting one of the propellers 120A, 120B, 120C, 120D, 120E thereon.

As is shown in FIG. 1A, each of the propellers 120A, 120B, 120C, 120D, 120E has different attributes. For example, the propeller 120A is a balanced propeller having two blades that is optimized for maximum thrust, and emits sound at a sound pressure level or intensity of ninety-five decibels (95 dB) and at a frequency of eight hundred fifty hertz (850 Hz) during operations at a predetermined speed (e.g., angular velocity). The propeller 120B is a balanced propeller having four blades that is configured for ultra-quiet operations, and emits sound at a sound pressure level or intensity of seventy-four decibels (74 dB) and at a frequency of eight hundred ninety-eight hertz (898 Hz) during operations at a predetermined speed. The propeller 120C is an imbalanced propeller having two blades, including a teardrop-shaped hole in one of the blades, that is configured for average lift and thrust, and emits sound at a sound pressure level or intensity of ninety-six decibels (96 dB) and at a frequency of two thousand four hertz (2004 Hz) during operations at a predetermined speed.

The propeller 120D is a balanced propeller having three blades with angled tips that is configured for high maneuverability, and emits sound at a sound pressure level or intensity of eighty-four decibels (84 dB) and at a frequency of seven hundred eighty-seven hertz (787 Hz) during operations at a predetermined speed. The propeller 120E is an imbalanced propeller having four blades, one of which is oversized or misshapen and includes a round hole therein, that is configured for high lift, and emits sound at a sound pressure level or intensity of eighty decibels (80 dB) and at a frequency of three thousand eleven hertz (3011 Hz) during operations at a predetermined speed.

In accordance with the present disclosure, the aerial vehicle 110 may be outfitted with one or more of each of the propellers 120A, 120B, 120C, 120D, 120E, e.g., with sets having one or more of such propellers, which may be selected on any basis, e.g., to provide the aerial vehicle 110 with specific thrust, lift or maneuverability capacities, or to cause the aerial vehicle 110 to emit a predetermined sound, and operated separately or in tandem and subject to any specific criteria, considerations or parameters such as their respective weights, shapes, or lift or drag profiles, as well as their angular velocities during operation. As is shown in FIG. TB, the motors 160B, 160C are equipped with the propellers 120A; and the motors 160A, 160D are equipped with the propellers 160E. The propellers 120A and the propellers 120E are aligned to rotate within a common plane, or in parallel planes. As is further shown in FIG. 1B, the motors 160B, 160C are rotating the propellers 120A under power as the aerial vehicle 110 travels in a specific direction, and the motors 160A, 160D are not operating. The powered rotation of the propellers 120A by the motors 160B, 160C causes the propellers 120A to emit sounds at a sound pressure level or intensity of ninety-five decibels (95 dB) and at a frequency of eight hundred fifty hertz (850 Hz) when the propellers 120A rotate at a predetermined speed (e.g., angular velocity).

As is discussed above, and in accordance with the present disclosure, the aerial vehicle 110 may operate one or more discrete sets of propellers, e.g., the propellers 120A and/or the propellers 120E, on any basis. For example, when maximum thrust is required, the propellers 120A may be operated. When maximum lift is required, the propellers 120E may be operated. When both lift and thrust are considerations, the propellers 120A, 120E may be operated concurrently, as necessary, at varying power levels. Likewise, the propellers 120A, 120E may also be operated separately where the respective sounds emitted by such propellers 120A, 120E during operation are desired, or concurrently, as necessary, and at varying power levels, where a blend of such sounds is desired, or where the sounds emitted by the aerial vehicle 110 are not essential.

As is shown in FIG. 1C, the motors 160A, 160D are rotating the propellers 120E under power as the aerial vehicle 110 travels in a specific direction, and the motors 160B, 160O are not rotating. The powered rotation of the propellers 120E by the motors 160A, 160D causes the propellers 120E to emit sound pressure level or intensity of eighty decibels (80 dB) and at a frequency of three thousand eleven hertz (3011 Hz) during operations at a predetermined speed.

Accordingly, the systems and methods of the present disclosure may operate different sets of propellers, including a set including one or more intentionally imbalanced propellers, as may be required based on any specific criteria, considerations or parameters, e.g., in order to effectively control or shape the noises emitted by such propellers during operation of the aerial vehicle. An aerial vehicle including multiple propellers, or sets of propellers, may operate such propellers in an alternating fashion, such as the aerial vehicle 110 shown in FIGS. 1B and 1C, in which one or more propellers is rotating under power while one or more other propellers are not rotated under power. Alternatively, an aerial vehicle may control or throttle the power provided to two or more sets of such propellers on any basis, e.g., to ensure that a specific sound (e.g., a sound having a selected sound pressure level or intensity and within a selected frequency spectrum) is emitted by the rotating propellers, including but not limited to any relevant operational characteristics, environmental conditions or other factors.

In this regard, by outfitting an aerial vehicle with a complement of propellers including one or more propellers that are balanced (e.g., in static balance and in dynamic balance), and one or more selected propellers that are imbalanced (e.g., out of static balance or dynamic balance) to a predetermined degree or extent, the aerial vehicle may be configured to emit any of a variety of specific sounds, as desired, during operation by manipulating the power applied to motors to which such propellers are mounted. An aerial vehicle so outfitted may, therefore, take the effects of noise on any humans or other animals into consideration as an operational constraint, and may instead be configured to emit pleasant or agreeable sounds when the aerial vehicle is within earshot of such humans or animals by rotating one or more imbalanced propellers during operation. Alternatively, the aerial vehicle may be configured to emit a specific sound that may be neither pleasant nor agreeable (e.g., a warning sound, a siren or an alarm) at predetermined times or when one or more specific operational characteristics or environmental conditions are observed.

An aerial vehicle may be outfitted with one or more propellers having a variety of different attributes that may be selected on any basis. For example, a propeller may be selected based on one or more parameters such as mass or one or more dimensions (e.g., radius or diameter, blade length, blade width, blade shape or blade angle). Additionally, a propeller may be selected based on one or more operational capacities, e.g., a measure or rating of the thrust capacity, the lift capacity or the speed capacity that may be provided by the propeller, a measure or rating of the maneuverability of an aerial vehicle equipped with such a propeller, or a measure or rating of the one or more sounds that may be emitted by the propeller during operation. A propeller may be selected based on a general level or degree of performance, or on a level or degree of performance in specific instances, e.g., with regard to specific goals or objectives such as maneuverability, fuel efficiency and/or battery life, or adverse weather conditions.

Operating aerial vehicles may emit a number of different sounds at varying sound pressure levels and within various frequency spectrums during operation. In many instances, sounds radiated from operating aerial vehicles include broadband sounds, e.g., energies that are distributed across wide bands or ranges of frequency, and narrowband sounds or tonals, e.g., which are typically centered around discrete frequencies or narrower bands or ranges, and are commonly periodic or harmonic in nature. For example, where an aerial vehicle includes a plurality of propellers, sounds radiated by the propellers may be determined as functions of the blade pass frequencies (or blade passing frequencies) of each of the propellers. A blade pass frequency is, as its name suggests, a frequency with which a blade on a rotating propeller passes a given point, and is determined as a function of an angular velocity of the rotating propeller and the number of blades provided on the rotating propeller. An operating aerial vehicle typically emits not only broadband sounds but also narrowband sounds, including strong fundamental tonal sounds at or near the blade pass frequency (or within a band that includes the blade pass frequency), and discrete sound elements at various harmonics of the blade pass frequency.

With regard to a rotating machine, the term "balance" (or "balanced") is used to refer to a condition in which all forces generated by, or acting upon, a rotating element are in a state of equilibrium. Disruptions to the state of equilibrium result in an "imbalance," or an imbalanced condition. A propeller (e.g., an aircraft or marine propeller) that is in static balance has a center of mass or gravity aligned along an axis of rotation. In such a condition, the propeller may spin about the axis of rotation without any net inertial forces acting thereon, such that the centrifugal forces associated with each of the blades of the propeller are balanced about the axis of rotation accordingly. Propellers having centers of mass or gravity that are displaced from the axis of rotation are said to be statically imbalanced, or out of static balance, and will generate net inertial forces during rotation. A propeller that is in dynamic balance has a principal axis of inertia that is not parallel to the axis of rotation, due to the fact that the centers of gravity of the various blades of the propeller are not in the same plane. In such a condition, rotation of the propeller will cause the propeller to vibrate or flutter at a critical speed that is determined based on an extent of the imbalance.

When a propeller is balanced, lower levels of structural, torsional, and rotating-shaft vibrations are observed during operation. When a propeller is imbalanced, however, undesirable vibratory forces and excessive noise levels are generated during operation. Traditionally, vibrations generated by the rotation of imbalanced propellers in aerial vehicles have been associated with increased risks of damage to propellers, shafts, bearings and other components. Accordingly, owners and operators of propeller-driven aerial vehicles regularly act to ensure that each of the propellers onboard such vehicles are properly balanced, both statically and dynamically, in order to reduce not only the risk of damage but also the vibratory forces and noise emitted by such propellers during operation. Traditionally, each propeller mounted to or operated by an aerial vehicle is balanced, both statically and dynamically.

The systems and methods of the present disclosure are directed to operating aerial vehicles with discrete sets of propellers that may be selected on any basis, e.g., operational criteria such as speed, lift, thrust, maneuverability, efficiency or noise, or any environmental conditions anticipated during the performance of the mission. The aerial vehicle may then be operated with the complement of propellers operating in any manner, e.g., alone or in any combination, in order to complete a mission in accordance with a transit plan, in order to cause the aerial vehicle to emit any kind or type of sound, or for any other purpose. By providing an aerial vehicle with two or more discrete sets of such propellers, a single aerial vehicle may operate in two or more modes during transit, with the respective sets of propellers operating alone or in tandem with one or more other sets, e.g., at various angular velocities and/or power levels that may be dynamically modulated as desired or required based on the operational objectives or demands of a particular mission. In some embodiments, each of the propellers in each of the complements may rotate about vertical axes, e.g., with the blades rotating in substantially horizontal planes that are common or in parallel to one another. In some other embodiments, the propellers of the various complements may rotate about different axes (e.g., at least one of which may be non-vertical), and with the blades rotating in different planes (e.g., at least some of which may be non-horizontal). In still other embodiments, the axes of rotation of the propellers and/or the planes within which the blades of such propellers rotate may be varied, e.g., by one or more motors or other components for repositioning motors and/or propellers.

In some embodiments, the systems and methods disclosed herein are directed to exploiting, not avoiding, the use of imbalanced propellers in aerial vehicles in order to cause such vehicles to emit specific sounds during operation. A set of propellers including one or more imbalanced propellers may be provided on an aerial vehicle and operated alone or in combination with one or more other propellers, combinations of imbalanced propellers, or both balanced and imbalanced propellers, and at angular velocities and/or power levels that cause the overall sound profile of the aerial vehicle to vary accordingly.

Thus, in some embodiments, where an aerial vehicle is to be operated within earshot of one or more humans or other animals, the aerial vehicle may be outfitted with a plurality of propellers including both balanced and imbalanced propellers that may be specifically selected based on various operational criteria, e.g., a thrust rating, a lift rating, a speed rating, a maneuverability rating or a noise rating of the respective propellers. Such propellers may then be operated, as necessary, in order to achieve one or more operational objectives or according to one or more demands. In particular, when the aerial vehicle passes within a vicinity of one or more humans or other animals, one or more imbalanced propellers may be operated in order to cause the aerial vehicle to radiate a selected sound until the aerial vehicle safely departs from the vicinity of the humans or other animals. The sounds may be selected based on the extent to which they are pleasant or annoying to such humans or animals, or on any other basis.

In some embodiments, a balanced propeller may be rotated to a predetermined speed, e.g., to above a critical speed for the propeller. For example, the propeller may be rotated during the operation of an aerial vehicle, or in a laboratory or testing facility. One or more sensors, e.g., microphones, piezoelectric sensors, vibration sensors, or any other acoustic sensors, may be used to capture information regarding the rotation of the propeller and any observed sounds or noises radiated therefrom. The observed sounds or noises may then be compared to sounds or noises that are desired to be emitted by the propeller during operation. If the observed sounds or noises are inconsistent with the desired sounds or noises; then one or more modifications or adjustments may be made to the propeller, e.g., to intentionally imbalance the propeller, and the modified propeller may be rotated again. Such modifications may include the addition or subtraction of mass from one or more of the blades of the propeller, or the modification of one or more parameters of the propeller. If the sounds or noises observed from the rotation of the modified propeller are consistent with the desired sounds or noises, then the propeller may be utilized during the operation of an aerial vehicle accordingly. If the sounds or noises observed from the rotation of the modified propeller are inconsistent with the desired sounds or noises, however, the propeller may be further modified with one or more modifications or adjustments and rotated again until such sounds or noises are sufficiently consistent with the desired noises.

In accordance with some other embodiments of the present disclosure, a propeller complement may be selected for an aerial vehicle that is scheduled to perform a specific mission. For example, the complement of propellers may be selected in accordance with a transit plan (e.g., a route from an origin to a destination, through any intervening waypoints) for the mission, or any predicted operational characteristics or environmental conditions anticipated during the performance of the mission, e.g., based on one or more attributes of the mission, the route, the origin, the destination, the waypoints, the operational characteristics or the environmental conditions. For example, the complement of propellers may be selected by estimating the sound pressure levels or intensities and frequency spectrums of sounds to be emitted by each of a plurality of propellers during operation, and identifying one or more desired sounds to be emitted by the aerial vehicle during the mission, and outfitting the aerial vehicle with propellers that will cause the aerial vehicle to emit sounds that are sufficiently similar to the desired sounds. Once the complement of propellers has been selected and installed on the aerial vehicle, the propellers may be operated, as necessary, in accordance with the transit plan or on any other basis.

In accordance with still other embodiments of the present disclosure, an aerial vehicle having a plurality of different onboard propellers may depart from an origin for a destination along a route in an original transit mode for a mission, e.g., in which each of the propellers is operating at a selected speed or at a particular power level, or is not operating. One or more sensors operating onboard the aerial vehicle may track the position and/or altitude of the aerial vehicle, and capture data regarding operational characteristics of the aerial vehicle or environmental conditions encountered by the aerial vehicle while in the original transit mode. Such sensors may also determine the sound pressure levels and/or frequency spectrums of sounds emitted by the aerial vehicle while in transit. If the emitted sound pressure levels and/or frequency spectrums are not consistent with a desired sound, e.g., a sound pressure level and/or a frequency spectrum that is preferred, then the transit mode of the aerial vehicle may be changed accordingly, e.g., based on one or more attributes of the mission, the route, the origin, the destination, one or more waypoints, the operational characteristics or the environmental conditions.

For example, where an aerial vehicle includes a first set of propellers for operating in a first transit mode, and the aerial vehicle arrives at a predetermined location, reaches a predetermined speed, altitude or battery level, or encounters a predetermined temperature or weather event, the aerial vehicle may be operated in a second transit mode in which a second set of propellers is operated either independently or in tandem with one or more of the first set of propellers, and at power levels that may be desired based on one or more thrust, lift, efficiency or acoustic considerations, or for any other purpose. In this regard, by equipping an aerial vehicle with two or more discrete sets of propellers, the aerial vehicle may be operated in a variety of different modes, and may be utilized to satisfy one or more operational objectives at different times, or respond to changing events or circumstances while performing a mission.

Figure 2G:
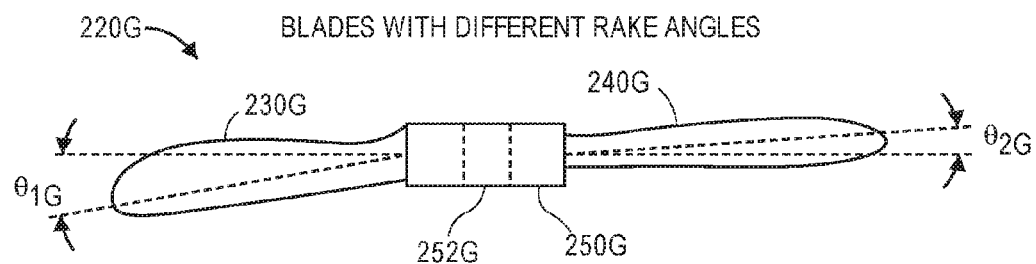

As is discussed above, an aerial vehicle may be operated with any number of discrete sets of propellers, and that such propellers may be either balanced (e.g., in static balance or in dynamic balance) or imbalanced, as needed, in order to cause an aerial vehicle to emit sound having a desired sound pressure level or within a desired frequency spectrum. In accordance with the present disclosure, a propeller may be intentionally imbalanced by effecting a change to one or more parameters of the propeller, e.g., a change to a mass or weight, a shape, a lift profile or a drag profile of one or more blades of the propeller, which may be accomplished in any number of ways. Referring to FIGS. 2A through 2I, a plurality of imbalanced propellers 220A, 220B, 220C, 220D, 220E, 220F, 220G, 220H, 220I are shown. As is shown in FIG. 2A, the propeller 220A includes a pair of blades 230A, 240A mounted about a hub 250A having a mounting bore 252A. The blade 240A has a length $l_{2A}$ that is greater than a length $l_{1A}$ of the blade 230A. Accordingly, due to their different lengths $l_{2A}$, $l_{1A}$, the blades 230A, 240A have different centers of mass with respect to the huh 250A, and the propeller 220A will be imbalanced (i.e., out of static balance or dynamic balance) when outfitted to an aerial vehicle (not shown) and rotated under power. The imbalance of the propeller 220A will cause the propeller 220A to radiate sounds at a discrete sound pressure level or intensity and within a finite frequency spectrum that may be different from the sounds radiated from a balanced propeller that is similarly sized.

As is shown in FIG. 2B, the propeller 220B includes a pair of blades 230B, 240B mounted about a hub 250B having a mounting bore 252B. The blade 240B has a width $w_{2B}$ that is greater than a width $w_{1B}$ of the blade 230B. Accordingly, due to their different widths $w_{2B}$, $w_{1B}$, the blades 230B, 240B have different centers of mass with respect to the hub 250B, and the propeller 220B will also be imbalanced when outfitted to an aerial vehicle (not shown) and rotated under power. The imbalance of the propeller 220B will cause the propeller 220B to radiate sounds at a discrete sound pressure level or intensity and within a finite frequency spectrum that may be different from the sounds radiated from a balanced propeller that is similarly sized. Likewise, as is shown in FIG. 2C, the propeller 220C includes a pair of blades 230C, 240C mounted about a hub 250C having a mounting bore 252C. The blade 230C includes a substantially circular hole 232C having an area $A_{1C}$ provided at a distance $l_{1C}$ from a center of the mounting bore 252C. The blade 240C includes a substantially ellipsoidal hole 242C having an area $A_{2C}$ provided at a distance $l_{2C}$ from a center of the mounting bore 252C. Accordingly, due to their different distributions of mass resulting from the holes 232C, 242C and the placements thereof with respect to the mounting bore 252C, the propeller 220C will also be imbalanced when outfitted to an aerial vehicle (not shown) and rotated under power. The imbalance of the propeller 220C will cause the propeller 220C to radiate sounds at a discrete sound pressure level or intensity and within a finite frequency spectrum that may be different from the sounds radiated from a balanced propeller that is similarly sized.

As is shown in FIG. 2D, the propeller 220D includes a pair of blades 230D, 240D mounted about a huh 250D having a mounting bore 252D. The blade 230D has an opening 232D having an area $A_{1D}$, and an adjustable cover 234D for concealing or exposing the opening 232D. The blade 240D has an opening 242D having an area $A_{2D}$, and an adjustable cover 244D for concealing or exposing the opening 242D. The adjustable covers 234D, 244D may be operated to conceal or expose the respective openings 232D, 242D in any manner, e.g., radially, laterally or in any direction relative to the openings 232D, 242D, using one or more electrical motors or other systems. Accordingly, depending on whether one or more of the adjustable covers 234D, 244D is concealing or exposing one or more of the openings 232D, 242D, the propeller 220D may be either balanced or automatically and selectively imbalanced, as needed, during operations. The adjustable covers 234D, 244D of the propeller 220D may therefore be used to determine the sound pressure level or intensity and frequency spectrum of the sounds radiated from the propeller 220D during operations.

As is shown in FIG. 2E, the propeller 220E includes a pair of blades 230E, 240E mounted about a hub 250E having a mounting bore 252E. The blade 230E has an opening 232E into which a slug 234E is inserted. The opening 232E is provided at a distance $l_{1E}$ from a center of the mounting bore 252E. The blade 240E has an opening 242E from which a core 244E was removed. The opening 242E is provided at a distance $l_{2E}$ from the center of the mounting bore 252E. Accordingly, depending on the mass or density of the slug 234E, or the distances $l_{1E}$, $l_{2E}$ from the openings 232E, 242E to the center of the mounting bore 252E, the blades 230E, 240E have different centers of mass with respect to the hub 250E, and the propeller 220E will be imbalanced when outfitted to an aerial vehicle (not shown) and rotated under power. The imbalance of the propeller 220E will cause the propeller 220E to radiate sounds at a discrete sound pressure level or intensity and within a finite frequency spectrum that may be different from the sounds radiated from a balanced propeller that is similarly sized.

As is shown in FIG. 2F, the propeller 220F includes a pair of blades 230F, 240F mounted about a hub 250F having a mounting bore 252F. The blades 230F, 240F are formed from different materials $m_{1F}$, $m_{2F}$ having different densities $\rho_{1F}$, $\rho_{2F}$. Accordingly, the blades 230F, 240F will have different centers of mass with respect to the hub 250F, even if the blades 230F, 240F have identical dimensions, and the propeller will be imbalanced when outfitted to an aerial vehicle (not shown) and rotated under power. The imbalance of the propeller 220F will cause the propeller 220F to radiate sounds at a discrete sound pressure level or intensity and within a finite frequency spectrum that may be different from the sounds radiated from a balanced propeller that is similarly sized, with the sound pressure level or intensity and frequency spectrum being determined based on s difference between the respective densities $\rho_{1F}$, $\rho_{2F}$.

As is shown in FIG. 2G, the propeller 220G includes a pair of blades 230G, 240G mounted about a hub 250G having a mounting bore 2526. The blades 230G, 240G are provided at different rake angles $\theta_{1G}$, $\theta_{2G}$ with respect to the hub 250G. Accordingly, the blades 230G, 240G will have different centers of mass with respect to the hub 250G, even if the blades 230G, 240G have identical dimensions, and the propeller will be imbalanced when outfitted to an aerial vehicle (not shown) and rotated under power. The imbalance of the propeller 220G will cause the propeller 220G to radiate sounds at a discrete sound pressure level or intensity and within a finite frequency spectrum that may be different from the sounds radiated from a balanced propeller that is similarly sized, with the sound pressure level or intensity and frequency spectrum being determined based on s difference between the respective blade angles $\theta_{1G}$, $\theta_{2G}$.

Figure 2H:
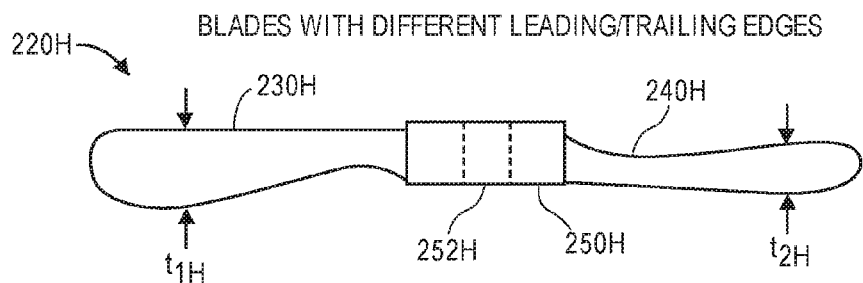

As is shown in FIG. 2H, the propeller 220H includes a pair of blades 230H, 240H mounted about a hub 250G having a mounting bore 252H. The blades 230H, 240H are provided with different thicknesses $t_{1H}$, $t_{2H}$ of their respective leading and trailing edges. Accordingly, the blades 230G, 240G will have different centers of mass with respect to the hub 250G, even if the blades 230G, 240G have identical dimensions, and the propeller will be imbalanced when outfitted to an aerial vehicle (not shown) and rotated under power. The imbalance of the propeller 220E will cause the propeller 220G to radiate sounds at a discrete sound pressure level or intensity and within a finite frequency spectrum that may be different from the sounds radiated from a balanced propeller that is similarly sized, with the sound pressure level or intensity and frequency spectrum being determined based on s difference between the respective blade angles $\theta_{1G}$, $\theta_{2G}$.

Figure 2I:
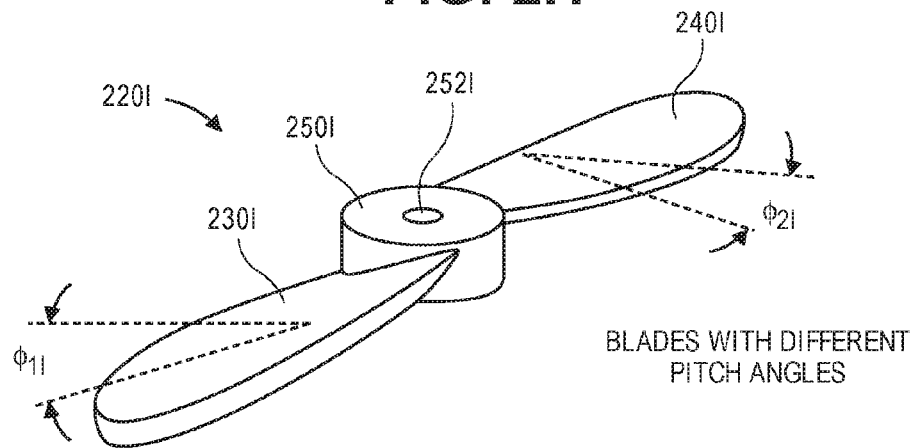

As is shown in FIG. 2I, the propeller 220I includes a pair of blades 230I, 240I mounted about a hub 250I having a mounting bore 252I. The blades 230I, 240I are provided at different pitch angles $\phi_{1I}$, $\phi_{2I}$ with respect to the hub 250I. Accordingly, the blades 230I, 240I will have different centers of mass with respect to the hub 250I, even if the blades 230I, 240I have identical dimensions, and the propeller will be imbalanced when outfitted to an aerial vehicle (not shown) and rotated under power. The imbalance of the propeller 220I will cause the propeller 220I to radiate sounds at a discrete sound pressure level or intensity and within a finite frequency spectrum that may be different from the sounds radiated from a balanced propeller that is similarly sized, with the sound pressure level or intensity and frequency spectrum being determined based on s difference between the respective rake angles $\phi_{1I}$, $\phi_{2I}$.

The aerial vehicles and propellers disclosed herein are not directed to any specific type or form of balanced or imbalanced propeller, or any specific process or technique for imbalancing a propeller, and are not limited to any of the propellers 220A, 220B, 220O, 220D, 220E, 220F, 220G, 220H, 220I of FIGS. 2A through 2I. For example, any number or type of propellers, including but not limited to one or more of the propellers disclosed in U.S. patent application Ser. No. 14/975,209, filed Dec. 18, 2015, the contents of which are incorporated by reference herein in their entirety, may be operated on an aerial vehicle in accordance with the systems and methods of the present disclosure.

According to some embodiments of the present disclosure, a propeller may be modified or customized in any manner, e.g., by modifying one or more parameters of one or more of the propeller, such as a mass, a shape, a lift profile or a drag profile of one or more of the blades of the propeller, in order to cause the propeller to radiate sounds at predetermined or desirable sound pressure levels or intensities, and within selected frequency spectrums. The extent to which a propeller must be modified may be determined through one or more operational or experimental analyses, which may be based upon characteristics of sounds radiated from the propeller during operation as compared to characteristics of desired sounds in order to identify or determine a modification to the propeller that may cause the propeller to radiate the desired sounds, or sufficiently similar sounds, during operation.

Figure 3:
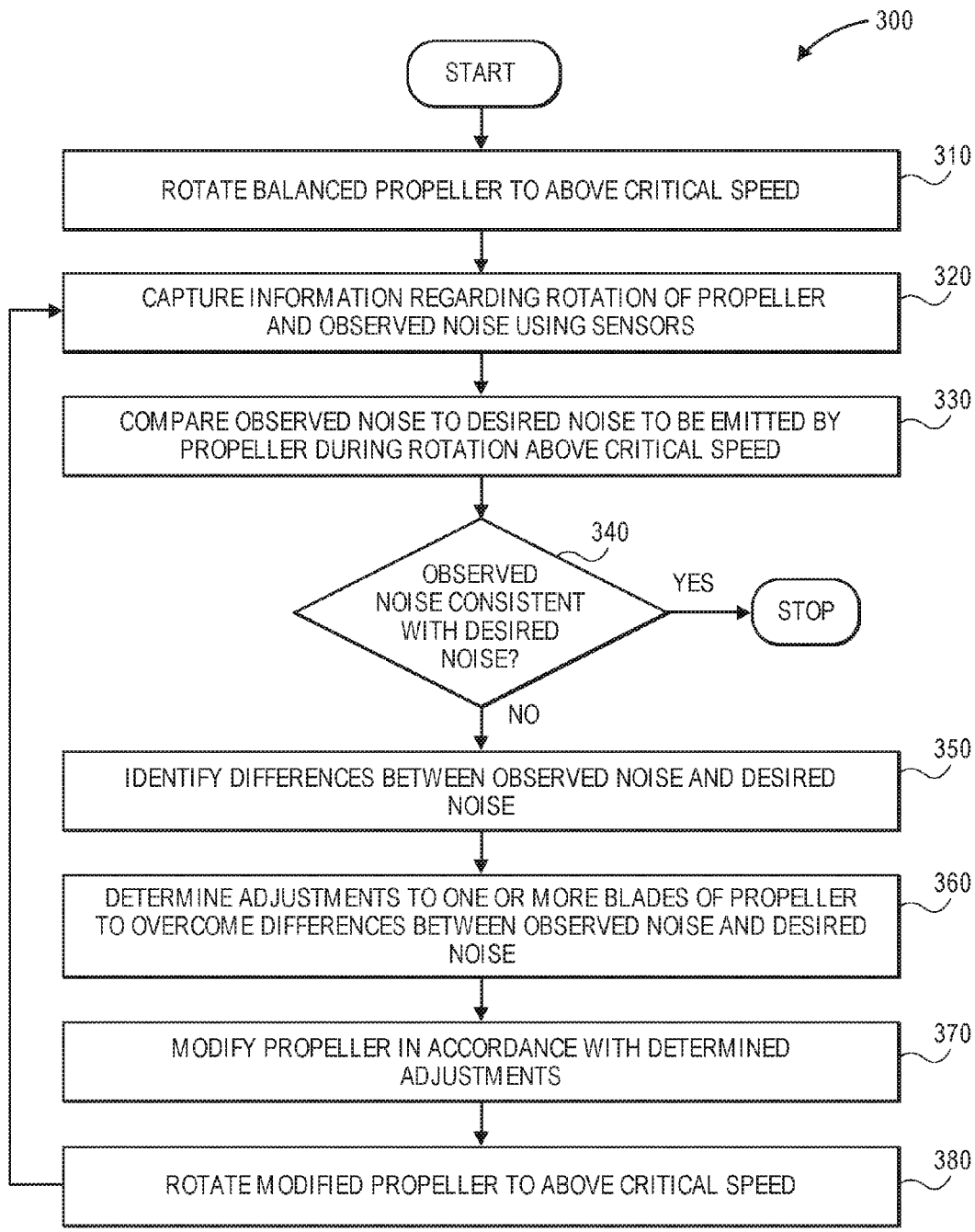
FIG. 3 is a flow chart of one process for operating a propeller in accordance with embodiments of the present disclosure.

Referring to FIG. 3, flow chart 300 of one process for operating a propeller in accordance with embodiments of the present disclosure is shown. At box 310, a balanced propeller is rotated to above a critical speed. As is noted above, a critical speed is an angular velocity of a propeller at which resonance, or vibration or oscillation of the propeller at a specific frequency (e.g., a resonant frequency) or within a frequency spectrum, begins to occur. At box 320, one or more sensors may be used to capture information regarding the rotation of the propeller and any observed noise emitted or radiated from the propeller. For example, where the balanced propeller is rotated to above the critical speed on an aerial vehicle in flight, the sensors may be provided about the shaft by which the propeller is mounted to a motor, or along a frame, a wing, a fuselage or one or more aspects of the aerial vehicle. Where the balanced propeller is rotated to above the critical speed in an experimental environment (e.g., a laboratory or like testing facility), the sensors may be positioned in any advantageous or desired location with respect to the rotating propeller.

At box 330, characteristics of the noise observed at box 320 are compared to characteristics of a desired noise to be emitted or radiated by the propeller during rotation above the critical speed. For example, where it is preferred or desired that a propeller emit sounds at a specific sound pressure level or intensity and within a specific frequency spectrum (e.g., a sound that may be more pleasant or soothing than a sound ordinarily emitted from an operating balanced propeller, or a sound that may be obnoxious, annoying or louder than a sound ordinarily emitted from an operating balanced propeller, and intended to alert or vex any nearby humans or other animals), a difference between the sound pressure levels or intensities and frequency spectrums of the noise observed at box 320 may be compared to the specific sound pressure level or intensity and frequency spectrum of the desired noise.

At box 340, whether the noise observed at box 320 is consistent with the desired noise is determined. For example, one or more frequencies of the observed noise may be compared to one or more frequencies of the desired noise, e.g., to one or more desired frequency spectrums. Likewise, the sound pressure levels or intensities of the observed noise may be similarly compared to the sound pressure levels or intensities of the desired noise, or to one or more bands or tolerances associated therewith. If the observed noise is determined to be consistent with the desired noise to within an acceptable level or degree, then the process ends.

If the observed noise is determined to be inconsistent with the desired noise, then the process advances to box 350, where any differences between the observed noise and the desired noise are determined. For example, differences between the sound pressure levels or intensities of the observed noise and the desired noise may be assessed, e.g., both independently and with respect to one or more operating characteristics of the aerial vehicle, including but not limited to the angular velocity at which the propeller is rotating. At box 360, one or more adjustments to the blades of the propeller may be identified to address the differences between the observed noise and the desired noise identified at box 350. For example, a mismatch between the masses, or the centers of mass, of two or more of the blades of the propeller intended to reduce or eliminate such differences may be proposed or selected.

At box 370, the propeller is modified in accordance with the determined adjustments. For example, a length or a width of one of the blades of the balanced propeller may be reduced, e.g., by one or more cutting, bending or slicing means, thereby resulting in an imbalanced propeller such as the propeller 220A of FIG. 2A or the propeller 220B of FIG. 2B. Alternatively, one or more holes may be formed within one or more of the blades, thereby resulting in an imbalanced propeller such as the propeller 220C of FIG. 2C. One or more adjustable covers may be operated to expose or conceal an opening in one or more of the blades, thereby resulting in an imbalanced propeller such as the propeller 220D of FIG. 2D. A slug may be inserted into a blade, or a core may be removed from a blade, thereby resulting in an imbalanced propeller such as the propeller 220E of FIG. 2E. Any means or method for changing the centers of mass of one or more blades of a propeller, or the locations of such centers, e.g., cutting, carving, sanding, rubbing, wearing, drilling, boring, or the like, may be utilized in order to modify a propeller based on the one or more adjustments identified at box 360. Once the propeller has been modified in accordance with the determined adjustments, the process advances to box 380, where the modified propeller is rotated to above a critical speed, and returns to box 320, where one or more sensors may capture information regarding the rotation of the propeller and any observed noise emitted or radiated from the propeller.

Figure 4A:
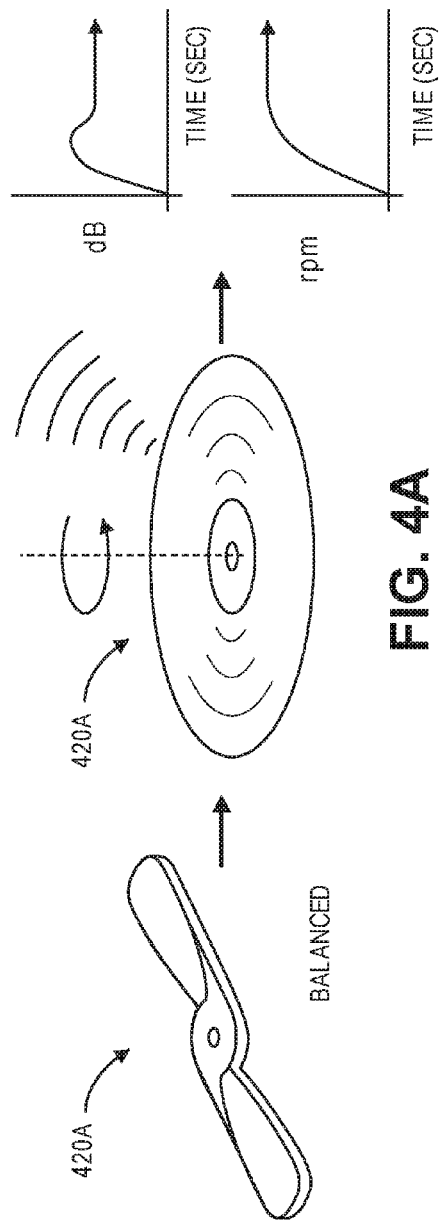
FIGS. 4A and 4B are views of aspects of a balanced propeller and an imbalanced propeller in accordance with embodiments of the present disclosure.
Figure 4B:
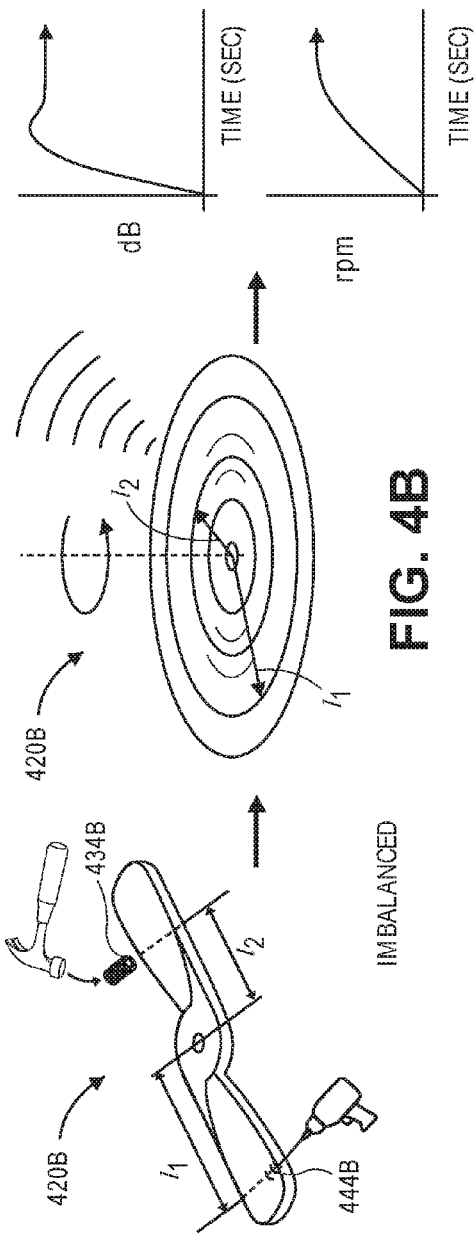

The evaluation of a propeller that is in static balance and in dynamic balance, and the modification of the balanced propeller to imbalance the propeller in an effort to cause the propeller to emit sound at a preferred sound pressure level or intensity and within a preferred frequency spectrum is shown in FIGS. 4A and 4B, in which views of aspects of a balanced propeller 420A and an imbalanced propeller 420B in accordance with embodiments of the present disclosure are shown. Except where otherwise noted, reference numerals preceded by the number "4" shown in FIG. 4A or FIG. 4B indicate components or features that are similar to components or features having reference numerals preceded by the number "2" shown in FIGS. 2A through 2I or by the number "1" shown in FIGS. 1A and 1B.

As is shown in FIG. 4A, the balanced propeller 420A may be rotated at or above a critical speed, and the rotation of the balanced propeller 420A may be monitored, e.g., to determine one or more characteristics of noise observed during the rotation (e.g., a sound pressure level or intensity). Information or data regarding such noises may be stored in at least one data store, along with characteristics of the propeller 420A (e.g., a mass, a diameter, a number of blades of the propeller 420A, as well as an angular velocity at which the propeller 420A is rotated).

As is discussed above with regard to the flow chart 300 of FIG. 3, the characteristics of the noise observed during the rotation of the propeller 420A may be compared to characteristics of a desired noise to be emitted by the propeller 420A during operation, and one or more modifications to the propeller 420A may be selected or predicted for resolving the differences between such characteristics. Referring to FIG. 4B, the propeller 420B is shown as being modified not only to include a slug 434B into a first blade 430B at a distance of $l_2$ from a center of the propeller 420B, but also to remove a core 444B into a second blade 440B at a distance of from the center of the propeller 420B. After the slug 434B has been inserted into the first blade 430B, and the core 444B has been removed from the second blade 440B, the propeller 420B may be rotated at or above a critical speed, and the rotation of the balanced propeller 420B may be monitored to determine one or more characteristics of noise observed during the rotation (e.g., a sound pressure level or intensity). Information or data regarding such noises may be stored in at least one data store, along with characteristics of the propeller 420B (e.g., a mass, a diameter, a number of blades of the propeller 420B, as well as an angular velocity at which the propeller 420B is rotated, and one or more dimensions of the slug 434B or the core 444B). The information or data regarding the noises and the propellers 420A, 420B may be used to develop and maintain a library of information or data regarding propellers of various sizes, shapes or configurations and the noises emitted thereby during operation when such propellers are in static balance and/or in dynamic balance, or when such propellers are in varying degrees of imbalance.

As is also discussed above, an aerial vehicle may be outfitted with a complement of propellers, each of which may be selected on any basis. For example, in some embodiments, an octo-copter may be equipped with sets of propellers that are configured for optimized performance based on different criteria. The octo-copter may be equipped with a first set of propellers generally configured for maximizing lift or thrust, and a second set of propellers optimized for specific goals or objectives such as maneuverability, fuel efficiency and/or battery life, or adverse weather conditions. Each of the sets of propellers may include as few as one and as many as seven propellers. During operation, the first set and the second set of propellers may be selectively operated, as necessary, either individually or collectively, depending on the demands or requirements set forth in a transit plan for a mission to be performed using the aerial vehicle. Such demands or requirements may include, but are not limited to, limits or thresholds on acoustic emissions from the aerial vehicle in transit.

Figure 5:
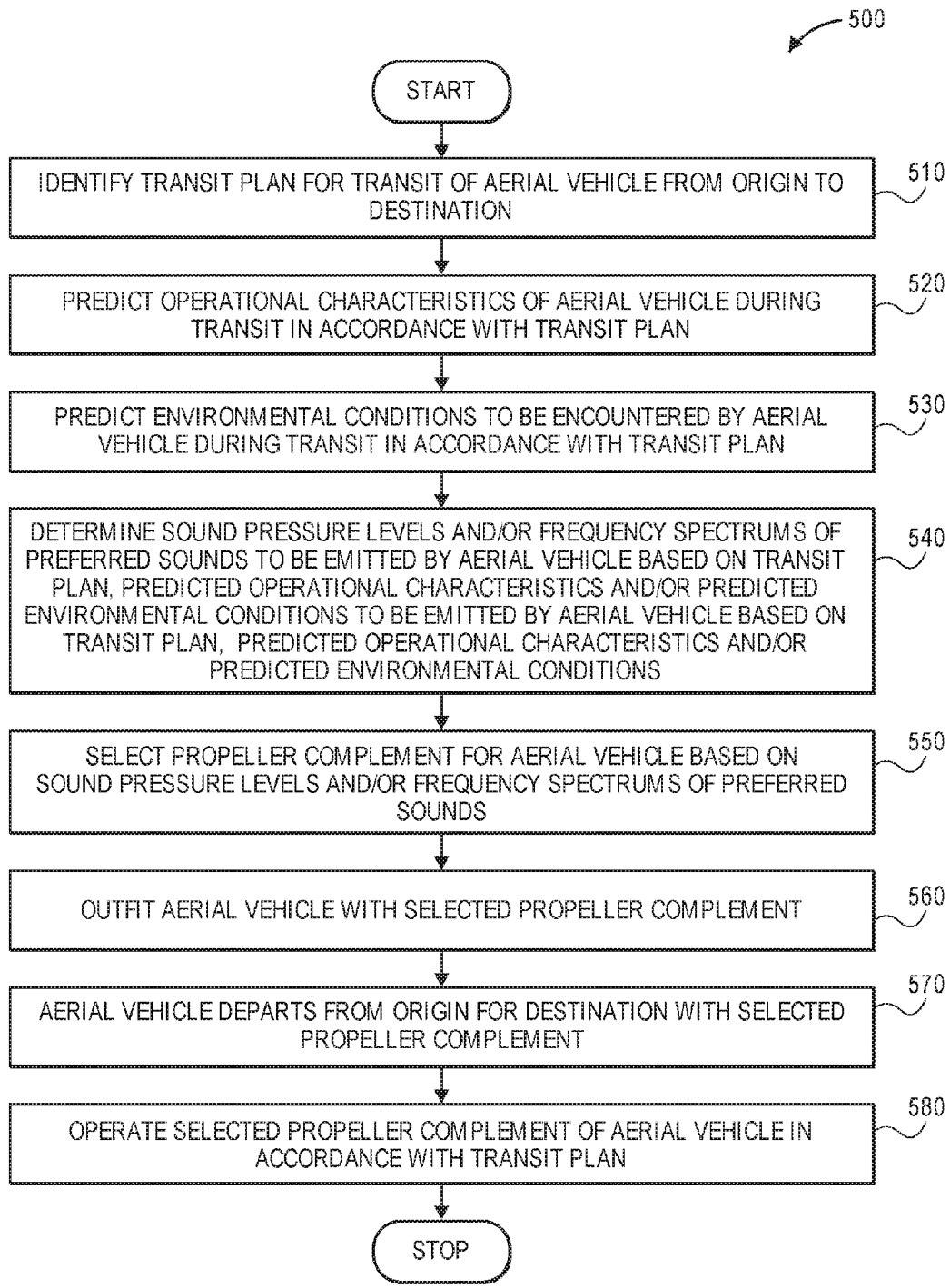
FIG. 5 is a flow chart of one process for operating an aerial vehicle in accordance with embodiments of the present disclosure.

Referring to FIG. 5, a flow chart 500 of one process for operating an aerial vehicle in accordance with embodiments of the present disclosure is shown. At box 510, a transit plan is identified for a transit of an aerial vehicle from an origin to a destination. The transit plan may include or indicate coordinates of the origin and/or the destination, as well as times when the aerial vehicle is expected to depart from the origin or arrive at the destination, or any other information or data regarding the transit of the aerial vehicle. The transit plan may further include a preferred route to be traveled by the aerial vehicle from the origin to the destination (e.g., courses, speeds, or coordinates of one or more waypoints any altitude restrictions or requirements, or any information or data regarding a payload to be carried by the aerial vehicle from the origin to the destination.

At box 520, operational characteristics of the aerial vehicle during the transit in accordance with the transit plan are predicted. For example, any dynamic attributes such as altitudes, courses, speeds, rates of climb or descent, turn rates, accelerations or tracked positions (e.g., latitudes and/or longitudes) of the aerial vehicle during the transit may be estimated based on the transit plan and any known relevant factors or historical data. At box 530, any environmental conditions to be encountered by the aerial vehicle during the transit are also predicted. For example, any temperatures, pressures, humidities, wind speeds, directions, measures of cloud coverage, sunshine, or surface conditions or textures of an environment between and including the origin and the destination may also be estimated based on the transit plan and any known relevant factors or historical data.

At box 540, sound pressure levels and/or frequency spectrums of sounds that wil preferably be emitted by the aerial vehicle are determined based on the transit plan, the predicted operational characteristics, and/or the predicted environmental conditions. For example, based on any requirements or constraints associated with or imposed by the transit plan, the anticipated operational characteristics of the aerial vehicle or the environmental conditions that the aerial vehicle is expected to encounter, a preferred sound to be emitted by the aerial vehicle (e.g., sound pressure levels and frequency spectrums) may be identified. Such characteristics may define or include a single threshold or limit (e.g., a minimum value, a maximum value or an average value of a sound pressure level or frequency), or one or more thresholds or limits (e.g., a spectrum, a distribution, a pattern or a band) depending on a velocity, a position or an altitude of the aerial vehicle, or any other factor. For example, a first sound pressure level and/or first frequency spectrum of sounds to be emitted within a vicinity of the origin (e.g., within earshot of humans or other animals) may be determined, while a second sound pressure level and/or frequency spectrums of sounds to be emitted while the aerial vehicle is in transit, and a third sound pressure level and/or frequency spectrums of sounds to be emitted while the aerial vehicle is within a vicinity of the destination may also be determined. Sound pressure levels and/or frequency spectrums of sounds to be emitted within a vicinity of any number of intervening waypoints may also be determined. Any number of sound pressure levels and/or frequency spectrums to be emitted by the aerial vehicle, e.g., at any intervals or for any durations, may be identified based on the transit plan, the predicted operational characteristics, and/or the predicted environmental conditions.

At box 550, a propeller complement for an aerial vehicle is selected based on the sound pressure levels and/or frequency spectrums of the preferred sounds. The aerial vehicle may be outfitted with a homogenous array of propellers based on the desired sound pressure levels and/or frequency spectrums, or with two or more sets of propellers, that are configured to cause the aerial vehicle to emit sounds that are consistent with the desired sound pressure levels and/or frequency spectrums. For example, in some embodiments, one or more of the propellers may be intentionally imbalanced to a predetermined extent in order to cause the aerial vehicle to emit a specific sound (e.g., sound at a specific sound pressure level and/or within a specific frequency spectrum) when such propellers are operating. Alternatively, those of ordinary skill in the pertinent arts will recognize that the propeller complement may be selected based on factors or criteria that are unrelated to the desired sound pressure levels and/or frequency spectrums in accordance with the present disclosure.

The aerial vehicles of the present disclosure may include any number of sets of propellers, and such sets may include any number of propellers. For example, a quad-copter may include a single set of four common propellers selected specifically for the purpose of emitting sound at a desired sound pressure level and/or within a desired frequency spectrum, or two or more sets of propellers selected for any specific purpose (e.g., two propellers for optimal thrust, two propellers for emitting sound at the desired sound pressure level and/or within a desired frequency spectrum; or four unique propellers, including one propeller for optimal battery life, one propeller for optimal performance in adverse weather conditions, one propeller for optimal lift and one propeller for emitting sound at the desired sound pressure level and/or within a desired frequency spectrum). Likewise, as other examples, a six-propeller aerial vehicle (e.g., a hexa-copter) may include a single set of six common propellers, or two or more sets of propellers (e.g., two sets of three propellers each; three sets of two propellers each; three sets of propellers including three propellers, two propellers and a single propeller each; or six unique propellers) that may be selected for any specific purpose, and an eight-propeller aerial vehicle (e.g., an octo-copter) may include two to eight unique sets of propellers that may also be selected for any specific purpose.

At box 560, the aerial vehicle is outfitted with the selected propeller complement. At box 570, the aerial vehicle departs from the origin for the destination with the selected propeller complement installed, and the process ends.

Accordingly, the systems and methods of the present disclosure may be directed to identifying and selecting propellers to be installed on an aerial vehicle prior to departing on a predetermined mission in accordance with a transit plan. In some embodiments, two or more sets of propellers may be selected for and mounted to the aerial vehicle prior to departure, and operated at specific times or at specific angular velocities in accordance with the transit plan. The sets of propellers may be selected for an aerial vehicle in order to cause the aerial vehicle to emit a predetermined sound during operation, such as is shown in the flow chart 500 of FIG. 5, and may include one or more intentionally imbalanced propellers, as necessary. Those of ordinary skill in the pertinent arts will recognize that sets of propellers may be selected on any basis other than a desired sound to be emitted, e.g., for lift, thrust, maneuverability or efficiency considerations at one or more points or along one or more segments of a transit plan, and that the sets of propellers may be operated based on such considerations.

Figure 6:
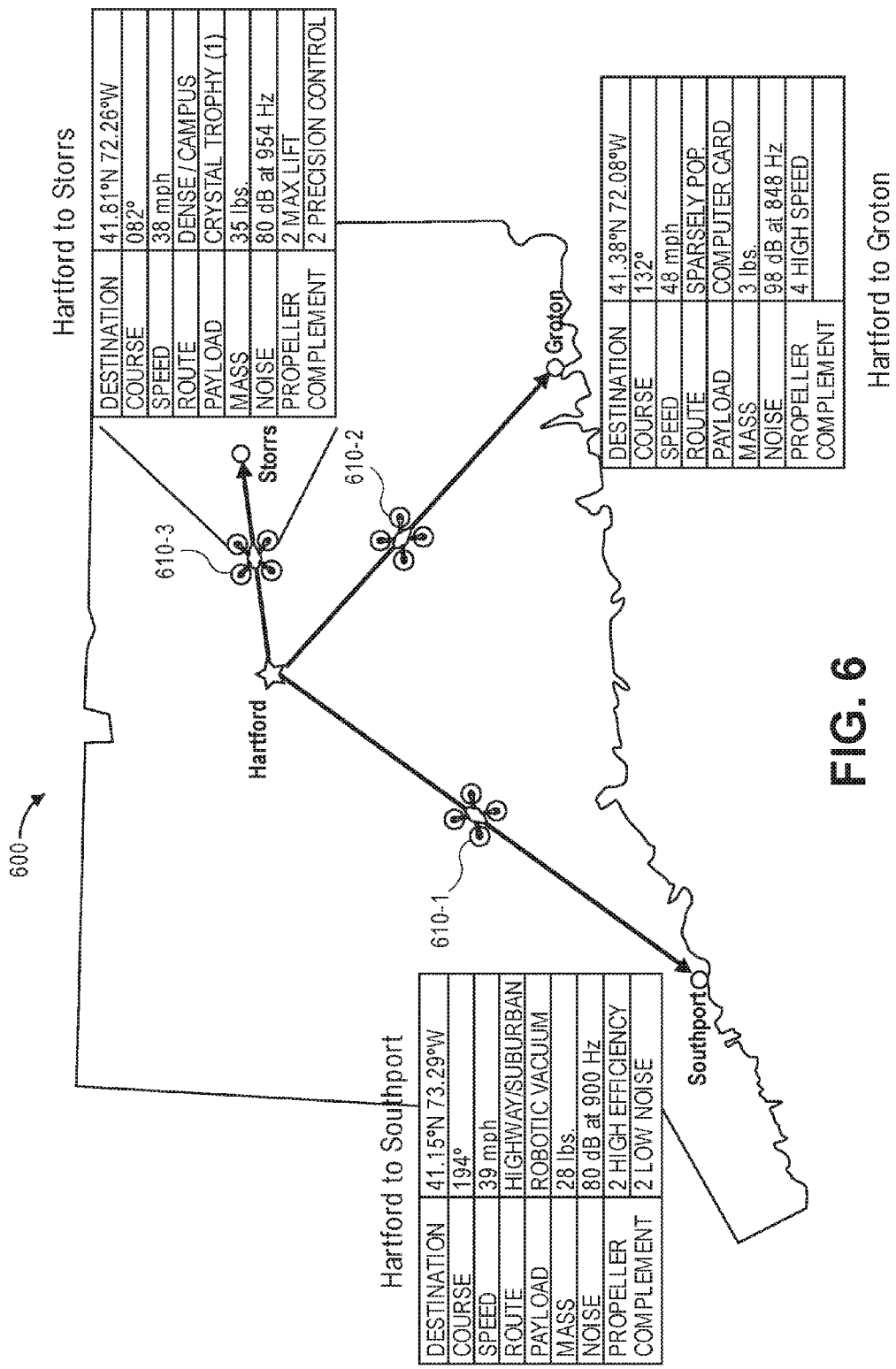
FIG. 6 is a view of aspects of one system for operating aerial vehicles in accordance with embodiments of the present disclosure.

The selection and use of different complements of propellers in accordance with different transit plans may be shown in FIG. 6. Referring to FIG. 6, views of aspects of one system 600 for operating aerial vehicles in accordance with embodiments of the present disclosure are shown. Except where otherwise noted, reference numerals preceded by the number "6" shown in FIG. 6 indicate components or features that are similar to components or features having reference numerals preceded by the number "4" shown in FIG. 4A or FIG. 4B, by the number "2" shown in FIGS. 2A through 2I or by the number "1" shown in FIGS. 1A and 1B.

As is shown in FIG. 6, a plurality of aerial vehicles 610-1, 610-2, and 610-3 is selected to execute one or more missions in accordance with transit plans. The aerial vehicle 610-1 is intended to travel from Hartford, Conn., to Southport, Conn., while carrying a twenty-eight pound (28 lbs.) payload. In accordance with a transit plan, the aerial vehicle 610-1 is expected to travel at a course of 194 degrees (194°), along a route that may be generally characterized as covering or paralleling highway routes and passing over suburban communities. Therefore, the aerial vehicle 610-1 will be outfitted with two high-efficiency propellers and two low-noise propellers, which may be operated separately or in tandem, and at different power levels, as necessary.

For example, the high-efficiency propellers may be operated at full power for much of the fifty-three mile transit from Hartford to Southport, e.g., portions of the transit within urban environments or passing over highways. The low-noise propellers may be operated as the aerial vehicle 610-1 passes over or within a vicinity of humans or other animals, or dwellings including such humans or animals, e.g., near the destination, in order to ensure that the sound emitted by the aerial vehicle 610-1 remains below a predetermined threshold. Alternatively, the sets of propellers may be operated together, at varying power levels, with the high-efficiency propellers being operated at comparatively higher power levels where conservation is a priority, and with the low-noise propellers being operated at comparatively higher power levels where noise control is a priority. Moreover, in some embodiments, one or both of the low-noise propellers or the high-efficiency propellers may be intentionally imbalanced in order to cause the aerial vehicle to emit predetermined sounds when the propellers are rotated under power during operation.

As is also shown in FIG. 6, the aerial vehicle 610-2 is intended to travel from Hartford to Groton, Conn., while carrying a three-pound (3 lbs.) payload. In accordance with a transit plan, the aerial vehicle 610-2 is expected to travel at a course of 132 degrees (132°), along a sparsely populated route. Therefore, because the route is sparsely populated, a noise threshold associated with the route is relatively high, and the aerial vehicle 610-2 may be outfitted with four high-speed propellers to enable the aerial vehicle 610-2 to deliver the payload to Groton and return to Hartford at a maximum speed, without regard to any noise emitted during the transit. As is further shown in FIG. 6, the aerial vehicle 610-3 is intended to travel from Hartford to Storrs, Conn., while carrying a thirty-five pound (35 lbs.) payload. In accordance with a transit plan, the aerial vehicle 610-3 is expected to travel at a course of 082 degrees (082°), along a dense route terminating at a campus. Given the substantially high mass of the payload carried by the aerial vehicle 610-3, and operational constraints associated with landing the aerial vehicle 610-3 in a compact environment, the aerial vehicle 610-3 may be outfitted with two propellers having maximum lift capacities, and two propellers for precision control (e.g., high maneuverability). The maximum lift and precision control propellers may be operated separately or in tandem, and at varying power levels, as necessary, during the performance of the mission.

Figure 7:
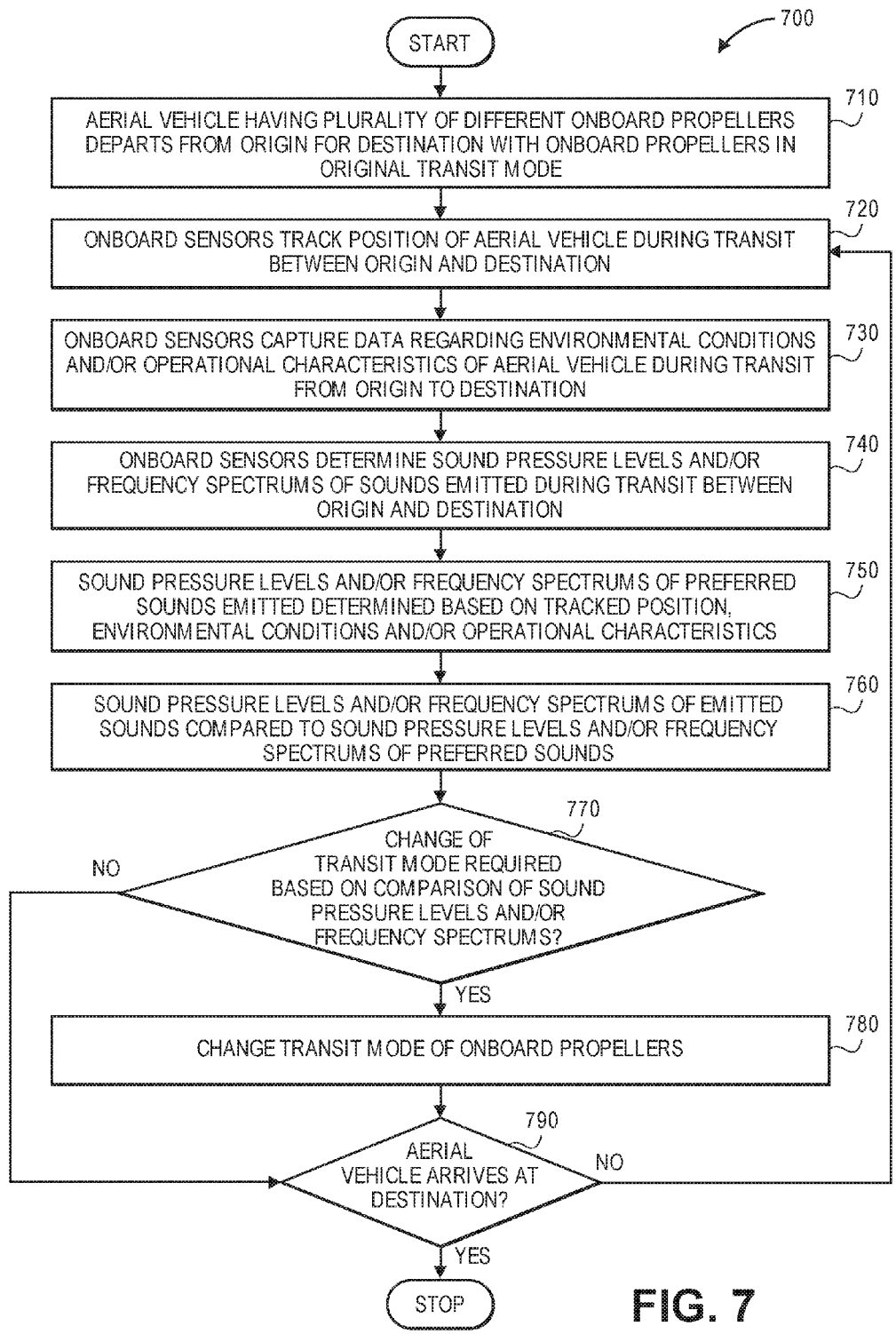
FIG. 7 is a flow chart of one process for operating an aerial vehicle in accordance with embodiments of the present disclosure.

As is discussed above, where an aerial vehicle is outfitted with two or more unique sets of propellers, at least one of which may include one or more intentionally imbalanced propellers, the sets of propellers may be operated, as necessary, in order to cause the aerial vehicle to emit one or more predetermined sounds Referring to FIG. 7, a flow chart 700 representing one process for operating an aerial vehicle having an imbalanced propeller in accordance with embodiments of the present disclosure is shown. At box 710, an aerial vehicle having a plurality of different onboard propellers departs from an origin for a destination with the onboard propellers in an original transit mode. For example, the aerial vehicle may be outfitted with separate sets of propellers that are optimized for different purposes or criteria, e.g., a set of propellers for maximizing lift or thrust, and a set of propellers optimized for maneuverability, power efficiency, prevailing weather conditions or emitting a specific noise, which may include one or more balanced or imbalanced propellers.

At box 720, one or more onboard sensors track the position of the aerial vehicle. At box 730, one or more onboard sensors capture data regarding environmental conditions and/or operational characteristics of the aerial vehicle during the transit from the origin to the destination. At box 740, one or more onboard sensors determine the sound pressure levels and/or frequency spectrums of sounds being emitted by the aerial vehicle during the transit from the origin to the destination. For example, the aerial vehicle may include one or more GPS receivers or sensors, compasses, speedometers, altimeters, gyroscopes, or other sensors for determining the position as well as the velocity or acceleration of the aerial vehicle, or any other operational characteristics of the aerial vehicle, while the aerial vehicle is in flight. The aerial vehicle may further include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges, accelerometers or imaging devices (e.g., digital cameras). The aerial vehicle may also include one or more sound sensors for detecting and capturing sound energy while the aerial vehicle is in flight, including one or more microphones, piezoelectric sensors, vibration sensors, or any other device configured to capture information or data regarding acoustic energy.

At box 750, sound pressure levels and/or frequency spectrums of sounds that will preferably be emitted by the aerial vehicle while the aerial vehicle is in flight are determined based on the tracked position, the environmental conditions and/or the operational characteristics. For example, in some embodiments, a preferred sound to be emitted by an aerial vehicle may be determined based on a position of the aerial vehicle (e.g., a first sound may be preferably emitted when the aerial vehicle is within earshot of humans or other animals, and a second sound may be preferably emitted when the aerial vehicle is out of range of such humans or animals, or when ambient noise levels are sufficiently high and the operating sounds emitted by the aerial vehicles are comparatively insignificant.

In some embodiments, e.g., when the aerial vehicle is expected to operate near dwellings or other inhabited buildings, the preferred sounds to be emitted when the aerial vehicle is within range of structures may have low sound pressure levels and/or frequency spectrums that are known not to annoy humans or animals. In some other embodiments, e.g., where it is desired to warn any humans or animals of an arriving or departing aerial vehicle, the preferred sounds to be emitted when the aerial vehicle is within range of dwellings or other inhabited buildings may have a high sound pressure level, e.g., approximately one hundred decibels (dB), and/or a frequency spectrum that is known to annoy such humans or animals, e.g., frequencies within a range of three thousand to four thousand Hertz (3000-4000 Hz). Moreover, in some other embodiments, the preferred sound may be identified as a function of the velocity of the aerial vehicle, the altitude of the aerial vehicle, a size (e.g., a net mass) of a payload carried by the aerial vehicle, weather conditions encountered by the aerial vehicle, or any other relevant environmental or operational factor.

In accordance with the present disclosure, desired sound pressure levels and/or frequency spectrums may be determined based not only on existing regulatory, statutory or procedural requirements but also on historical data, e.g., by providing information or data regarding the position of the aerial vehicle, the operating characteristics of the aerial vehicle, or the environmental conditions within which the aerial vehicle is operating as inputs to a machine learning system trained to recognize preferred sounds. Desired sounds may also be identified based on operational events such as passing above or below a predetermined altitude, exceeding or falling below a predetermined airspeed, or arriving within or departing from a range of a predetermined location. The information or data utilized to identify desired sounds may be weighted based on the reliability of extrinsic or intrinsic information or data determined at box 720, box 730 or box 740 using onboard sensors (e.g., an extent to which the information or data may be expected to remain constant), the quality of the predicted extrinsic or intrinsic information or data (e.g., a level of confidence in estimates or forecasts on which such information or data is derived), or on any other factor.

At box 760, the sound pressure levels and/or frequency spectrums of the preferred sounds to be emitted by the aerial vehicle as determined at box 750 are compared to the sound pressure levels and/or frequency spectrums of sounds being emitted by the aerial vehicle during operation as determined at box 740. For example, the extent to which the sound pressure levels and/or intensities of sounds being emitted by the aerial vehicle deviate from the desired sound pressure levels or intensities and/or desired frequency spectrums may be determined. At box 770, if the sound pressure levels and/or frequency spectrums of sounds being emitted by the aerial vehicle are not sufficiently different from those of the desired sounds, then the process returns to box 720, where the aerial vehicle continues to operate in accordance with the original transit mode, and where the position of the aerial vehicle is tracked using one or more onboard sensors.

If the sound pressure levels and/or frequency spectrums of the sounds emitted by the aerial vehicle are sufficiently different from those of the desired sounds, then the process advances to box 780, where a transit mode of the onboard propellers is changed. For example, where the aerial vehicle is outfitted with two or more sets of discrete propellers, and where a first set of the propellers is operating in the original transit mode, a second set of the propellers may be operated in a subsequent transit mode, and the first set of the propellers may be stopped. Likewise, where the aerial vehicle is outfitted with a first set of discrete propellers and a second set of discrete propellers, each operating at a first power level and a second power level, respectively, the power applied to each of the first set and the second set of propellers may be throttled or changed to vary the sounds emitted by the aerial vehicle during operation. In some embodiments of the present disclosure, one or more imbalanced propellers may be operated or stopped, as necessary, in order to modify the sounds emitted by the aerial vehicle during operations. In still other embodiments, the state of balance of one or more of the propellers may be automatically changed, e.g., by exposing or concealing one or more openings provided within a blade of a propeller, such as the propeller 220D of FIG. 2D, or in any other manner. The operating status of any number of propellers provided on an aerial vehicle may be modified in any manner, as necessary, in order to alter the sound pressure levels and/or frequency spectrums emitted by the aerial vehicle in accordance with the present disclosure.

At box 790, whether the aerial vehicle has arrived at its destination is determined. If the aerial vehicle has arrived at its destination, the process ends. If the aerial vehicle has not arrived at its destination, however, then the process returns to box 720, where the position of the aerial vehicle is tracked using one or more onboard sensors.

Accordingly, the systems and methods of the present disclosure may be utilized to modify a transit mode of an aerial vehicle, as necessary, or to operate an aerial vehicle in two or more transit modes, in order to change a sound pressure level or intensity and/or a frequency spectrum of sounds emitted by the aerial vehicle. The transit mode may be modified by starting or stopping the operation of one or more propellers, e.g., one or more balanced or imbalanced propellers, or by modifying the power applied to one or more of such propellers. The modifications to the transit mode may be identified and implemented based on the position of the aerial vehicle, or based on any operating characteristics of the aerial vehicle (e.g., altitudes, courses, speeds, rates of climb or descent, turn rates, accelerations), or any environmental conditions encountered by the aerial vehicle (e.g., temperatures, pressures, humidities, wind speeds or directions, measures of cloud coverage or sunshine, or surface conditions or textures within a given environment.

Figure 8:
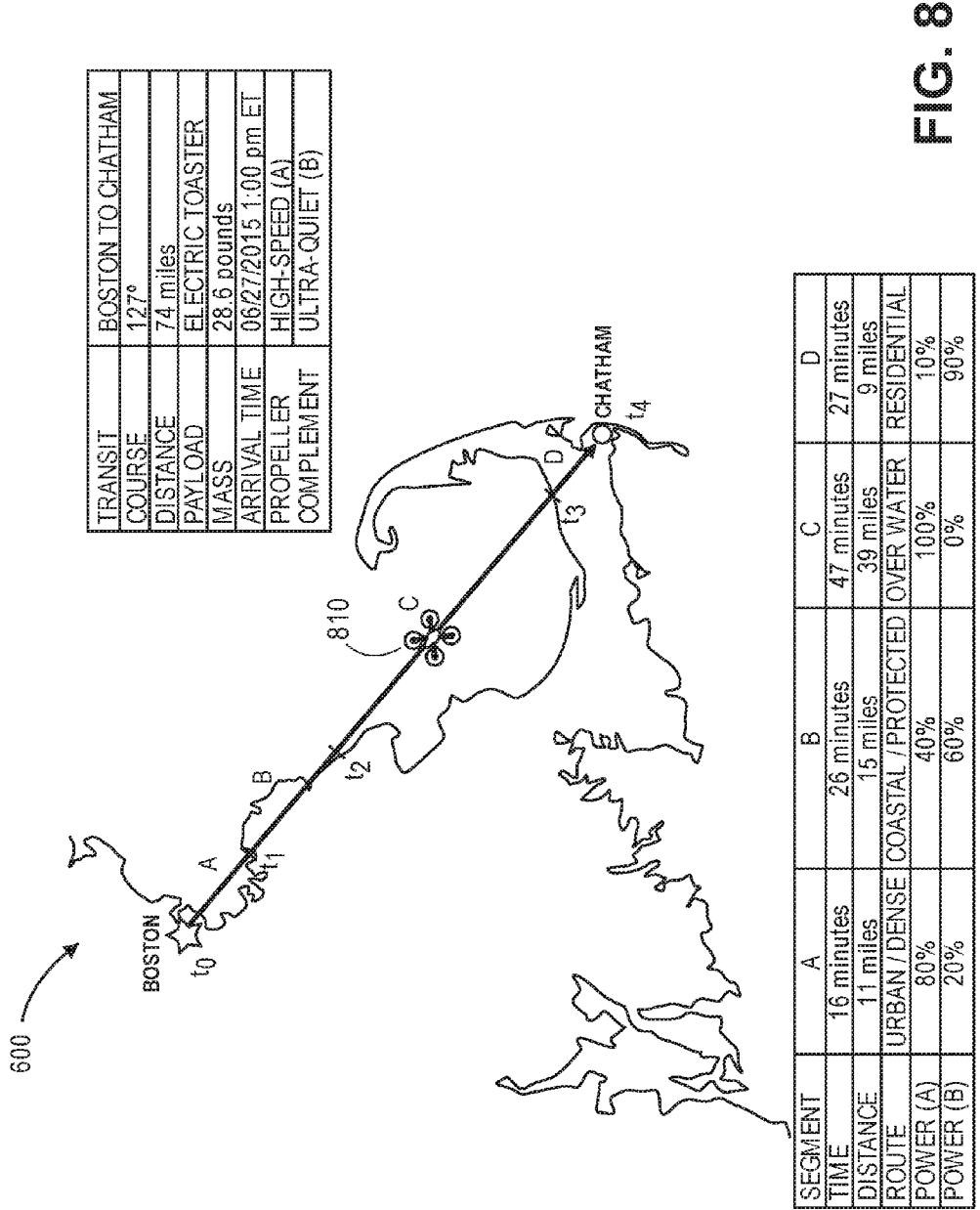
FIG. 8 is a view of aspects of an operating aerial vehicle in accordance with embodiments of the present disclosure.

One example in which a transit mode of an aerial vehicle may be changed in response to sounds being by the aerial vehicle, or in order to cause preferred or desired sounds to be emitted by the aerial vehicle, is shown in FIG. 8. Referring to FIG. 8, a view of aspects of an operating aerial vehicle 810 in accordance with embodiments of the present disclosure is shown. Except where otherwise noted, reference numerals preceded by the number "8" shown in FIG. 8 indicate components or features that are similar to components or features having reference numerals preceded by the number "6" shown in FIG. 6, by the number "4" shown in FIG. 4A or FIG. 4B, by the number "2" shown in FIGS. 2A through 2I or by the number "1" shown in FIGS. 1A and 1B.

The aerial vehicle 810 is equipped with a propeller complement including a first set of high-speed propellers (Set A) and a second set of ultra-quiet propellers (Set B) and is intended to travel from an origin in Boston, Mass., to a destination in Chatham, Mass. The aerial vehicle 810 is slated to depart from Boston with a 28.6 pound (28.6 lbs.) payload at 1 o'clock in the afternoon on Jun. 27, 2015, on a course of 127 degrees (127°), for a seventy-four mile (74 mile) transit to Chatham.

As is shown in FIG. 8, the route to be traveled by the aerial vehicle 810 is broken into four segments. Initially, upon departing from Boston, the aerial vehicle 810 is expected to travel over a dense, urban environment for approximately sixteen minutes, and a distance of approximately eleven miles. During this segment, the first set of high-speed propellers may be operated at eighty percent (80%) power, and the second set of ultra-quiet propellers may be operated at twenty percent (20%) power. Next, after the aerial vehicle 810 clears the dense, urban environment, the aerial vehicle 810 is expected to reach a first intervening waypoint and enter a coastal protected zone, through which the aerial vehicle will travel for approximately twenty-six minutes and for a distance of approximately fifteen miles. Within the coastal protected zone, the first set of high-speed propellers may be operated at forty percent (40%) power, and the second set of ultra-quiet propellers may be operated at sixty percent (60%) power, e.g., to reduce the levels of noise emitted by the aerial vehicle during operation.

Upon reaching a second intervening waypoint, the aerial vehicle 810 is expected to depart the coastal protected zone and travel over water for approximately forty-seven minutes and a distance of approximately thirty-nine miles. Over the water, where noise is typically not a concern, the first set of high-speed propellers may be operated at one hundred percent (100%) power, and the second set of ultra-quiet propellers need not be operated. Finally, once the aerial vehicle 810 reaches a third intervening waypoint (viz., on land), the aerial vehicle 810 is expected to enter a residential zone, where suppressing noise may be a primary concern. Within the residential zone, the first set of high-speed propellers may be operated at ten percent (10%) power, and the second set of ultra-quiet propellers may be operated at ninety percent (90%) power, until the aerial vehicle 810 reaches the destination.

Accordingly, an aerial vehicle, such as the aerial vehicle 810 of FIG. 8, equipped with two or more discrete sets of propellers may be configured to operate in one or more distinct transit modes, which may be selected on any basis, including but not limited to a position of the aerial vehicle, any operational characteristics of the aerial vehicle, or any environmental conditions encountered by the aerial vehicle during flight. Moreover, one or more of the discrete propellers may be balanced or imbalanced, and may be specifically configured to emit sounds at a specific sound pressure level or intensity and within a specific frequency spectrum during operation. In this regard, the aerial vehicle may operate in nearly any environment, and may be configured to emit various sounds (e.g., sounds at specific sound pressure levels or within specific frequency spectrums) that may be desired or appropriate for a given environment.

Figure 9:
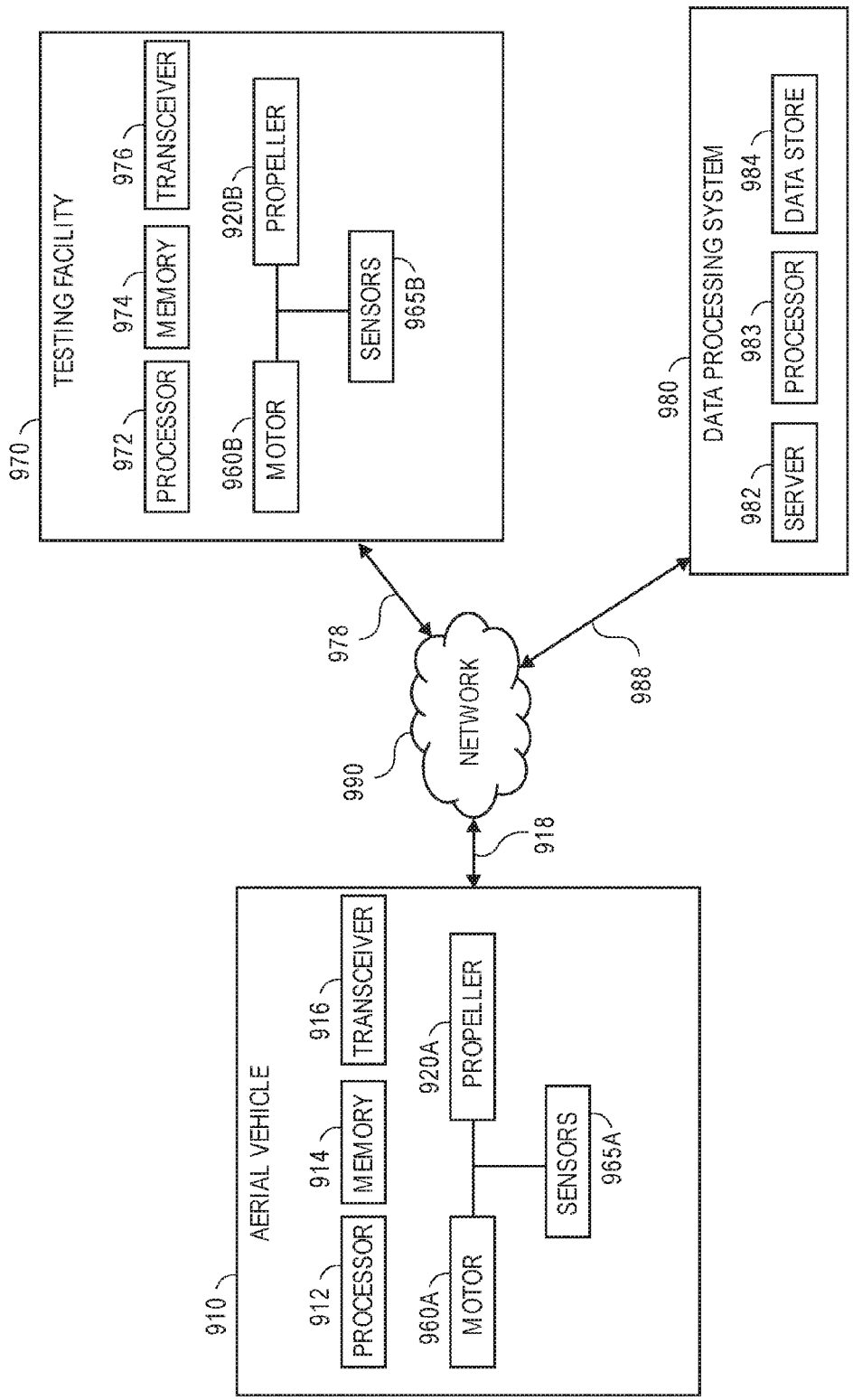
FIG. 9 is a block diagram of aspects of one system for operating an aerial vehicle in accordance with embodiments of the present disclosure.

Referring to FIG. 9, a block diagram of components of one system 900 for active airborne noise abatement in accordance with embodiments of the present disclosure. The system 900 of FIG. 9 includes an aerial vehicle 910, a testing facility 970 and a data processing system 980 connected to one another over a network 990. Except where otherwise noted, reference numerals preceded by the number "9" shown in the block diagram of FIG. 9 indicate components or features that are similar to components or features having reference numerals preceded by number "8" shown in FIG.

8, by the number "6" shown in FIG. 6, by the number "4" shown in FIG. 4A or FIG. 4B, by the number "2" shown in FIGS. 2A through 2I or by the number "1" shown in FIGS. 1A and 1B.

The aerial vehicle 910 includes a processor 912, a memory 914 and a transceiver 916, as well as one or more propellers 920A, one or more motors 960A for rotating the propellers 920A under power, and a plurality of sensors 965A (e.g., environmental or operational sensors and/or sound sensors).

The processor 912 may be configured to perform any type or form of computing function, including but not limited to the execution of one or more machine learning algorithms or techniques. For example, the processor 912 may control any aspects of the operation of the aerial vehicle 910 and the one or more computer-based components thereon, including but not limited to the transceiver 916, the motor 960A, or the sensors 965A. The aerial vehicle 910 may likewise include one or more control systems (not shown) that may generate instructions for conducting operations thereof, e.g., for operating the motor 960A or one or more rudders, ailerons, flaps or other control components provided thereon (not shown). For example, where the propeller 920A includes one or more computer-controlled features for imbalancing a balanced propeller, or for varying a degree of imbalance of a propeller, e.g., one or more of the adjustable covers 234D, 244D of the propeller 220D of FIG. 2D, the processor 912 may control the operation of such covers 234D, 244D directly or indirectly through one or more of control systems. Such control systems may be associated with one or more other computing devices or machines, such as the processor 912, and may communicate with the testing facility 970 and/or data processing system 980 or one or more other computer devices (not shown) over the network 990, as indicated by line 918, through the sending and receiving of digital data.

The aerial vehicle 910 further includes one or more memory or storage components 914 for storing any type of information or data, instructions for operating the aerial vehicle 910, information or data captured by one or more of the sensors 965A, or information or data regarding propellers of various sizes, shapes or configurations and the noises emitted thereby during operation. The transceiver 916 may be configured to enable the aerial vehicle 910 to communicate through one or more wired or wireless means, e.g., wired technologies such as Universal Serial Bus (or "USB") or fiber optic cable, or standard wireless protocols such as Bluetooth® or any Wireless Fidelity (or "Win") protocol, such as over the network 990 or directly.

The propeller 920A may be one or more bladed mechanical devices for generating one or more propulsive forces, e.g., lift and/or thrust, for the aerial vehicle 910. The propeller 920A may have any mass or dimensions, or any number of blades, and may be balanced statically and/or dynamically, or imbalanced. The propeller 920A is coupled to the motor 960A, e.g., by a shaft. The motor 960A may be any type or form of motor, including but not limited to a brushless direct current (or DC) electric motor such as an outrunner brushless motor or an inrunner brushless motor. The motor 960A may receive instructions for operation via one or more computer devices, e.g., the processor 912, or one or more control systems (not shown) that may generate instructions for initiating or stopping operations of the motor 960A, or operating the motor 960A at any predetermined speed.

The sensors 965A may include any type or form of sensor for capturing information or data regarding any aspect of the operation of the aerial vehicle 910 in general, or the motor 960A and/or the propeller 920A in particular. For example, the sensors 965A may include one or more components or features for determining one or more attributes of an environment in which the aerial vehicle 910 is operating, or may be expected to operate, including extrinsic information or data or intrinsic information or data. Some such sensors 965A may include, but are not limited to, a Global Positioning System ("GPS") receiver or sensor, a compass, a speedometer, an altimeter, a thermometer, a barometer, a hygrometer, or a gyroscope. Those of ordinary skill in the pertinent arts will recognize that the sensors 965A may further include any type or form of device or component for determining an environmental condition within a vicinity of the aerial vehicle 910 in accordance with the present disclosure. For example, the sensors 965A may also include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges, accelerometers or the like, as well as one or more imaging devices (e.g., digital cameras).

The sensors 965A may also include other components or features for detecting and capturing sound energy in a vicinity of an environment in which the aerial vehicle 910 is operating, or may be expected to operate. Such sensors 965A may include one or more microphones (e.g., a transducer such as a dynamic microphone, a condenser microphone, a ribbon microphone or a crystal microphone configured to convert acoustic energy of any intensity and across any or all frequencies into one or more electrical signals, and may include any number of diaphragms, magnets, coils, plates, or other like features for detecting and recording such energy), piezoelectric sensors (e.g., sensors configured to convert changes in pressure to electrical signals, including one or more crystals, electrodes or other features), or vibration sensors.

The testing facility 970 may be configured to operate propellers in a manner that simulates actual in-flight operation and performance. The testing facility 970 may include one or more computer devices including a processor 972, a memory 974 and a transceiver 976, as well as one or more propellers 920B, one or more motors 960B for rotating the propellers 920B under power, and a plurality of sensors 965B. The processor 972, the memory 974 and the transceiver 976 may execute functions or operate in a manner similar to those described above with regard to the processor 912, the memory 914 and the transceiver 916 of the aerial vehicle 910, and may communicate with the data processing system 980 or one or more other computer devices (not shown) over the network 990, as indicated by line 978, through the sending and receiving of digital data.

The propeller 920B may also be, like the propeller 920A, one or more bladed mechanical devices for generating one or more propulsive forces, e.g., lift and/or thrust, in an experimental environment within the testing facility 970. The propeller 920B may have any mass or dimensions, or any number of blades, and may be balanced statically and/or dynamically, or imbalanced. The propeller 920B is coupled, e.g., by a shaft, to the motor 960B, which may be any type or form of motor, such as a brushless DC electric motor. The motor 960B may receive instructions for operation via one or more computer devices, e.g., the processor 972, or one or more control systems (not shown) that may generate instructions for initiating or stopping operations of the motor 960B, or operating the motor 960B at any predetermined speed.

The sensors 965B may, like the sensors 965A of the aerial vehicle 910, include any type or form of sensor for capturing information or data regarding any aspect of the operation of the testing facility 970, or the motor 960B and/or the propeller 920B in particular. For example, the sensors 965B may include one or more components or features for determining one or more attributes of an environment within the testing facility 970, including extrinsic information or data or intrinsic information or data. Those of ordinary skill in the pertinent arts will recognize that the sensors 965B may include any type or form of device or component for determining an environmental condition within the testing facility 970 in accordance with the present disclosure. For example, the sensors 965B may also include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges, accelerometers or the like, as well as one or more imaging devices (e.g., digital cameras).

The sensors 965B may also include other components or features for detecting and capturing sound energy within the testing facility 970. Such sensor 965B may include one or more microphones (e.g., a transducer such as a dynamic microphone, a condenser microphone, a ribbon microphone or a crystal microphone configured to convert acoustic energy of any intensity and across any or all frequencies into one or more electrical signals, and may include any number of diaphragms, magnets, coils, plates, or other like features for detecting and recording such energy), piezoelectric sensors (e.g., sensors configured to convert changes in pressure to electrical signals, including one or more crystals, electrodes or other features), or vibration sensors.

The data processing system 980 includes one or more physical computer servers 982 having a plurality of databases 984 associated therewith, as well as one or more computer processors 983 provided for any specific or general purpose. For example, the data processing system 980 of FIG. 9 may be independently provided for the exclusive purpose of receiving, analyzing or storing operational characteristics, environmental conditions, acoustic signals or other information or data received from the aerial vehicle 910 or the testing facility 970 or, alternatively, provided in connection with one or more physical or virtual services configured to receive, analyze or store such operational characteristics, environmental conditions, acoustic signals or other information or data, as well as one or more other functions. The servers 982 may be connected to or otherwise communicate with the databases 984 and the processors 983. The databases 984 may store any type of information or data, including but not limited to operational characteristics, environmental conditions, acoustic signals or other information or data. The servers 982 and/or the computer processors 983 may also connect to or otherwise communicate with the network 990, as indicated by line 988, through the sending and receiving of digital data. For example, the data processing system 980 may include any facilities, stations or locations having the ability or capacity to receive and store information or data, such as media files, in one or more data stores, e.g., media files received from the aerial vehicle 910 or the testing facility 970, or from one another, or from one or more other external computer systems (not shown) via the network 990. In some embodiments, the data processing system 980 may be provided in a physical location. In other such embodiments, the data processing system 980 may be provided in one or more alternate or virtual locations, e.g., in a "cloud"-based environment. In still other embodiments, the data processing system 980 may be provided onboard one or more aerial vehicles, including but not limited to the aerial vehicle 910, or within the testing facility' 970.

The network 990 may be any wired network, wireless network, or combination thereof, and may comprise the Internet in whole or in part. In addition, the network 990 may be a personal area network, local area network, wide area network, cable network, satellite network, cellular telephone network, or combination thereof. The network 990 may also be a publicly accessible network of linked networks, possibly operated by various distinct parties, such as the Internet. In some embodiments, the network 990 may be a private or semi-private network, such as a corporate or university intranet. The network 990 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 910, the testing facility 970 or the data processing system 980 may use any web-enabled or Internet applications or features, or any other client-server applications or features including E-mail or other messaging techniques, to connect to the network 990, or to communicate with one another, such as through short or multimedia messaging service (SMS or MMS) text messages. For example, the aerial vehicle 910 and/or the testing facility 970 may be adapted to transmit information or data in the form of synchronous or asynchronous messages to the data processing system 980 or to any other computer device in real time or in near-real time, or in one or more offline processes, via the network 990. Those of ordinary skill in the pertinent art would recognize that the aerial vehicle 910, the testing facility 970 or the data processing system 980 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 912, the processor 972 or the processor 983, or any other computers or control systems utilized by the aerial vehicle 910, the testing facility 970 or the data processing system 980, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMS, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings and having any intended industrial, commercial, recreational or other use. In particular, although some of the embodiments disclosed herein reference balanced or unbalanced propellers having two blades, or aerial vehicles having four propellers, those of ordinary skill in the pertinent arts will recognize that the systems and methods of the present disclosure may be utilized in connection with propellers having any number of blades, and in connection with aerial vehicles having any number of propellers. Moreover, although some of the embodiments disclosed herein reference the use of balanced or imbalanced propellers on aerial vehicles, those of ordinary skill in the pertinent arts will recognize that the systems and methods of the present disclosure may be utilized in connection with seagoing vessels, as well.

Furthermore, those of ordinary skill in the pertinent arts will recognize that the systems and methods disclosed herein may be used to cause an aerial vehicle to radiate a series of sounds at predetermined sound pressure levels and/or within predetermined frequency spectrums. By controlling the operation of a plurality of propellers, e.g., one or more balanced or imbalanced propellers, an aerial vehicle may effectively emit music in accordance with one or more predetermined scores, or may even synthesize speech.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3, 5 or 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z." unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
a frame;
a sound sensor;
a first motor mounted to the frame;
a second motor mounted to the frame;
a first propeller coupled to the first motor, wherein the first propeller is statically balanced and dynamically balanced;
a second propeller coupled to the second motor, wherein the second propeller is at least one of statically imbalanced or dynamically imbalanced, and wherein the second propeller is configured to emit a first sound having a first sound pressure level and within a first frequency spectrum when rotated at a critical speed; and
a computing device having a memory and one or more computer processors,
wherein the computing device is configured to at least:
initiate a first operation of the first motor at a first time;
determine information regarding at least a second sound emitted by the unmanned aerial vehicle at a second time using the at least one sound sensor, wherein the information regarding at least the second sound comprises at least a second sound pressure level and at least a second frequency spectrum, and wherein the second time follows the first time; and
initiate a second operation of the second motor at a third time based at least in part on the information regarding at least the second sound emitted by the unmanned aerial vehicle at the second time, wherein the third time follows the second time.

2. An unmanned aerial vehicle comprising:
a frame;
at least one position sensor;
a first motor mounted to the frame;
a second motor mounted to the frame;
a first propeller coupled to the first motor, wherein the first propeller is statically balanced and dynamically balanced;
a second propeller coupled to the second motor, wherein the second propeller is at least one of statically imbalanced or dynamically imbalanced, and wherein the second propeller is configured to emit a first sound having a first sound pressure level and within a first frequency spectrum when rotated at a critical speed; and
a computing device having a memory and one or more computer processors,
wherein the computing device is configured to at least:
initiate a first operation of the first motor at a first time;
determine a position of the aerial vehicle at a second time using the at least one position sensor, wherein the second time follows the first time;
initiate a second operation of the second motor at a third time based at least in part on the position of the aerial vehicle at the second time.

3. A method to operate an aerial vehicle having a first set of motors, a second set of motors, a first set of propellers and a second set of propellers, the method comprising:
identifying a preferred sound to be emitted by the aerial vehicle in flight;
determining at least one of a sound pressure level or a frequency spectrum of the preferred sound using at least one computer processor;
selecting a propeller based at least in part on the sound pressure level or the frequency spectrum of the preferred sound;
outfitting one of the first set of motors with the selected propeller prior to a first time, wherein the selected propeller is the at least one of the first set of propellers, and wherein the selected propeller is one of not statically balanced or not dynamically balanced;
initiating a first operation of each of the first set of motors at the first time, wherein each of the first set of motors is coupled to one of the first set of propellers; and
initiating a second operation of each of the second set of motors at a second time, wherein each of the second set of motors is coupled to one of the second set of propellers, and wherein the second time follows the first time.

4. The method of claim 3, wherein the selected propeller comprises a first blade and a second blade, and
wherein a mass of the first blade is not equal to a mass of the second blade.

5. The method of claim 3, wherein a center of mass of the selected propeller is not aligned with an axis of rotation of the selected propeller.

6. A method to operate an aerial vehicle having a first set of motors, a second set of motors, a first set of propellers and a second set of propellers, the method comprising:
initiating a first operation of each of the first set of motors at a first time, wherein each of the first set of motors is coupled to one of the first set of propellers;
identifying a sound emitted by a first propeller during the first operation using at least one computer processor, wherein the first propeller is one of the first set of propellers;
determining at least one of a sound pressure level or a frequency spectrum of the sound emitted by the first propeller during the first operation using the at least one computer processor;
determining at least one of a sound pressure level or a frequency spectrum of a preferred sound to be emitted by the first propeller in flight using the at least one computer processor;
identifying at least one of a first difference between the sound pressure level of the sound emitted by the first propeller during the first operation and the sound pressure level of the preferred sound to be emitted by the first propeller in flight or a second difference between the frequency spectrum of the sound emitted by the first propeller during the first operation and the frequency spectrum of the preferred sound to be emitted by the first propeller in flight using the at least one computer processor;
determining a modification to at least one parameter of the first propeller based at least in part on at least one of the first difference or the second difference using the at least one computer processor;

causing the modification to the at least one parameter of the first propeller prior to a second time, wherein the modification causes the first propeller to be at least one of not statically balanced or not dynamically balanced, and wherein the second time follows the first time;

initiating a second operation of each of the first set of motors at the second time; and initiating a third operation of each of a second set of motors at a third time.

7. The method of claim 6, wherein the at least one parameter of the first propeller is at least one of:
a mass of at least a first blade of the first propeller;
a shape of at least the first blade of the first propeller;
a lift profile of the first propeller; or
a drag profile of the first propeller.

8. The method of claim 7, wherein causing the modification to the at least one parameter of the first propeller prior to the first time comprises at least one of:
forming a hole in the first blade;
reducing a width of the first blade;
reducing a length of the first blade;
removing a core from the first blade;
inserting a slug into the first blade;
exposing an opening in the first blade;
changing a blade angle of the first blade;
changing a rake angle of the first blade; or
changing a thickness of the first blade.

9. A method to operate an aerial vehicle having a first set of propellers and a second set of propellers, the method comprising:
determining a position of the aerial vehicle at a first time using at least one sensor; and
in response to determining the position of the aerial vehicle at the first time,
initiating a first operation of each of a first set of motors at a second time based at least in part on the position of the aerial vehicle at the first time, wherein the first time is not later than the second time, wherein each of the first set of motors is coupled to one of the first set of propellers, and wherein at least one of the first set of propellers is not statically balanced or is not dynamically balanced, and
initiating a second operation of each of a second set of motors at a third time, wherein each of the second set of motors is coupled to one of the second set of propellers.

10. A method to operate an aerial vehicle having a first set of propellers and a second set of propellers, the method comprising:
determining an environmental condition in a vicinity of the aerial vehicle at a first time using at least one sensor; and
in response to determining the environmental condition in the vicinity of the aerial vehicle at the first time,
initiating a first operation of each of a first set of motors at a second time based at least in part on the environmental condition in the vicinity of the aerial vehicle at the first time, wherein the first time is not later than the second time, wherein each of the first set of motors is coupled to one of the first set of propellers, and wherein at least one of the first set of propellers is not statically balanced or is not dynamically balanced; and
initiating a second operation of each of a second set of motors at a third time, wherein each of the second set of motors is coupled to one of the second set of propellers, wherein the environmental condition in the vicinity of the aerial vehicle at the third time comprises at least one of:
a temperature;
a pressure;
a humidity;
a wind speed;
a wind direction;
a weather event;
a level of cloud coverage;
a level of sunshine; or
a surface condition.

11. A method to operate an aerial vehicle having a first set of propellers and a second set of propellers, the method comprising:
determining an operational characteristic of the aerial vehicle at a first time using at least one sensor; and
in response to determining the operational characteristic of the aerial vehicle at the first time,
initiating a first operation of each of a first set of motors at a second time based at least in part on the operational characteristic of the aerial vehicle at the first time, wherein the first time is not later than the second time, wherein each of the first set of motors is coupled to one of the first set of propellers, and wherein at least one of the first set of propellers is not statically balanced or is not dynamically balanced; and
initiating a second operation of each of a second set of motors at a third time, wherein each of the second set of motors is coupled to one of the second set of propellers,
wherein the operational characteristic of the aerial vehicle at the third time comprises at least one of:
an altitude;
a course;
a speed;
a climb rate;
a descent rate;
a turn rate; or
an acceleration.

12. A method to operate an aerial vehicle having a first set of propellers and a second set of propellers, the method comprising:
determining information regarding at least one sound emitted by the aerial vehicle at a first time using at least one sensor, wherein the information regarding the at least one sound comprises at least one of a sound pressure level of the at least one sound or a frequency spectrum of the at least one sound; and
in response to determining information regarding the at least one sound emitted by the aerial vehicle at the first time,
initiating a first operation of each of a first set of motors at a second time, wherein each of the first set of motors is coupled to one of the first set of propellers; and
initiating a second operation of each of a second set of motors at a third time, wherein each of the second set of motors is coupled to one of the second set of propellers.

13. A method to operate an aerial vehicle having a first set of propellers and a second set of propellers, the method comprising:
identifying a mission for the aerial vehicle;
determining a first attribute of the mission for the aerial vehicle;

selecting the at least one of the first set of propellers based at least in part on the first attribute of the mission for the aerial vehicle;

causing the aerial vehicle to be outfitted with the first set of propellers prior to a first time;

initiating a first operation of each of a first set of motors at the first time, wherein each of the first set of motors is coupled to one of the first set of propellers; and initiating a second operation of each of a second set of motors at a second time, wherein each of the second set of motors is coupled to one of the second set of propellers, wherein at least one of the first set of propellers is not statically balanced or is not dynamically balanced.

14. The method of claim 13, wherein the first attribute of the mission for the aerial vehicle is at least one of:

a location of an origin for the mission;

a location of a destination for the mission;

a dimension or a mass of a payload for the mission;

a course for the aerial vehicle during the mission;

a speed for the aerial vehicle during the mission;

an anticipated environmental condition to be encountered by the aerial vehicle during the mission;

an anticipated operational characteristic of the aerial vehicle during the mission; or an anticipated sound to be emitted by the aerial vehicle during the mission.

15. A method comprising:

causing a first propeller to rotate to at least a critical speed, wherein the first propeller has a plurality of blades;

determining characteristics of a sound radiating from the first propeller at at least the critical speed, wherein the characteristics of the sound comprise at least one of a first sound pressure level or a first frequency spectrum;

identify characteristics of a preferred sound, wherein the characteristics of the preferred sound comprise at least one of a second sound pressure level or a second frequency spectrum;

determining a difference between at least one of the characteristics of the sound radiating from the first propeller at at least the critical speed and at least one of the characteristics of the preferred sound using at least one computer processor;

modifying the first propeller based at least in part on the difference;

coupling the first propeller to a first motor mounted to an aerial vehicle at a first time; and initiating a first operation of the first motor after the first time.

16. The method of claim 15, wherein modifying the first propeller comprises at least one of:

forming a hole in at least one of the plurality of blades;

reducing a width of the at least one of the plurality of blades;

reducing a length of the at least one of the plurality of blades;

removing a core from the at least one of the plurality of blades;

inserting a slug into the at least one of the plurality of blades;

exposing an opening in the at least one of the plurality of blades;

changing a blade angle of the at least one of the plurality of blades;

changing a rake angle of the at least one of the plurality of blades; or changing a thickness of the at least one of the plurality of blades.

17. The method of claim 15, wherein causing the first propeller to rotate to at least the critical speed further comprised:

coupling the first propeller to the first motor mounted to the aerial vehicle at a second time, wherein the second time precedes the first time; and initiating a second operation of the first motor after the second time and prior to the first time, wherein the characteristics of the sound radiating from the first propeller at least the critical speed are determined prior to the first time.

18. The method of claim 17, wherein causing the first propeller to rotate to at least the critical speed further comprised:

coupling the first propeller to a second motor provided in a testing facility at a second time, wherein the second time precedes the first time; and initiating a second operation of the second motor after the second time and prior to the first time.

* * * * *

UNITED STATES PATENT AND TRADEMARK OFFICE
CERTIFICATE OF CORRECTION

PATENT NO. : 9,745,050 B2
APPLICATION NO. : 14/975563
DATED : August 29, 2017
INVENTOR(S) : Brian C. Beckman and Allan Ko It is certified that error appears in the above-identified patent and that said Letters Patent is hereby corrected as shown below:

In the Claims

Column 32:
Line 27, Claim 17, "comprised:" should read as, --comprises:--.

Column 32:
Line 38, Claim 18, "comprised:" should read as, --comprises:--.

Signed and Sealed this
Twentieth Day of December, 2022

Katherine Kelly Vidal
*Director of the United States Patent and Trademark Office*